United States Patent [19]
Okazaki et al.

[11] Patent Number: 5,636,907
[45] Date of Patent: Jun. 10, 1997

[54] AUTOMOTIVE BRAKE FLUID PRESSURE CONTROL APPARATUS

[75] Inventors: Kouji Okazaki, Anjou; Masayoshi Takeda, Kariya; Tomohiro Katou, Anjou; Mamoru Sawada, Yokkaichi, all of Japan

[73] Assignee: Nippondenso Co., Ltd., Kariya, Japan

[21] Appl. No.: 514,507

[22] Filed: Aug. 11, 1995

[30] Foreign Application Priority Data

Aug. 11, 1994 [JP] Japan .................................. 6-189570

[51] Int. Cl.[6] .................................................. B60T 8/32
[52] U.S. Cl. .................... 303/10; 303/116.1; 303/113.2; 303/191
[58] Field of Search ................... 303/116.1, 10–12, 303/116.3, 116.2, 116.4, 113.2, 113.3, 119.1, 139, 114.1, 191; 188/355–359

[56] References Cited

U.S. PATENT DOCUMENTS

| | | | |
|---|---|---|---|
| 4,878,715 | 11/1989 | Toda . | |
| 4,971,400 | 11/1990 | Jonner . | |
| 5,054,861 | 10/1991 | Resch | 303/113.2 |
| 5,156,449 | 10/1992 | Wetzel | 303/113.2 |
| 5,180,216 | 1/1993 | Kirstein | 303/113.2 |
| 5,205,623 | 4/1993 | Holzmann et al. . | |
| 5,207,485 | 5/1993 | Tröster | 303/113.2 |
| 5,211,454 | 5/1993 | Schaefer et al. | 303/113.2 |
| 5,271,667 | 12/1993 | Takata et al. . | |

FOREIGN PATENT DOCUMENTS

| | | |
|---|---|---|
| 538600 | 4/1993 | European Pat. Off. . |
| 3906530 | 9/1990 | Germany . |
| 4019347 | 1/1992 | Germany . |
| 2-18153 | 1/1990 | Japan . |
| 2-95959 | 4/1990 | Japan . |
| 5-654 | 1/1993 | Japan . |
| 5-65057 | 3/1993 | Japan . |

*Primary Examiner*—Douglas C. Butler
*Attorney, Agent, or Firm*—Cushman, Darby & Cushman IP Group of Pillsbury Madison & Sutro, LLP

[57] ABSTRACT

Self-suction pumps are driven to take in brake fluid from a master-cylinder side before performing brake TRC control when at a low temperature and moreover when a vehicle is stopped. During driving of these self-suction pumps, pressure-increasing control valves and pressure-reducing control valves are both opened and brake fluid is accumulated in reservoirs. Because of this, an amount of pump discharge employed in brake TRC control when at a low temperature is assured, and responsiveness of brake TRC control is enhanced.

48 Claims, 18 Drawing Sheets

AUTOMOTIVE BRAKE FLUID PRESSURE CONTROL APPARATUS

CROSS REFERENCE TO RELATED APPLICATION

This application is based upon and claims priority from Japanese Patent Application No. Hei. 6-189570 filed Aug. 11, 1994, the contents of which are incorporated herein by reference.

BACKGROUND OF THE INVENTION

1. Field of the Invention

The present invention relates to an automotive brake fluid pressure control apparatus employed, for example, in traction control during acceleration slippage and in vehicle motion control during turning or the like.

2. Description of the Related Art

Conventionally, as shown in FIG. 18, a hydraulic circuit which drives hydraulic pumps P1 and P2 with a hydraulic motor MR, has employed in an automotive brake fluid pressure control apparatus, for example, in traction control during acceleration slippage.

This hydraulic circuit performs traction control on a vehicle having front-wheel drive (FF) and a front-mounted engine, and valves and the like to perform traction control are disposed in a brake fluid conduit reaching from a master cylinder (M/C) to wheel cylinders (W/C) of left and right front wheels FL and FR. Specifically, the conventinal hydraulic circuit includes master-cylinder cutoff valves (SM valves) which cut off brake fluid from the M/C, reservoir cutoff valves (SR valves) which cut off communication from a reservoir R on the M/C side to the intake sides of the hydraulic pumps P1 and P2, and also electromagnetic-type valves V1 and V2 which perform holding and release of high brake-fluid pressure applied to the W/Cs.

Accordingly, when executing traction control with this hydraulic circuit (hereinafter described with reference to the FL wheel), the braking force was controlled with the holding and release of brake-fluid pressure performed by the valves V1 and V2 in a state where the conduit reaching the valves V1 and V2 had been interrupted by the SM valves, the conduit reaching the intake sides of the hydraulic pumps P1 and P2 had been caused to be communicated by the SR valve and moreover the high-pressure brake fluid had been discharged by driving the hydraulic pump P1.

However, when attempting to initiate traction control as described above at a low temperature, there existed a problem in that an amount of discharge of the hydraulic pump P1 was insufficient, and traction control could not be favorably performed.

That is to say, the viscous resistance of the brake fluid increases at a low temperature, and so there existed a problem in that a sufficient amount of discharge could not immediately be assured, and appropriate traction control was impossible, even in a case where driving of the hydraulic pump P1 was initiated to perform traction control. Moreover, because the conduit reaching from the M/C to the hydraulic pump P1 via the SR valve is considerably long, effects due to low temperature are large, and countermeasures must be taken when the temperature is low.

Furthermore, the need for performing traction increases at a low temperature due to freezing of a road surface and the like, and so countermeasures at low temperature are especially desired.

Additionally, when pump driving was initiated after the occurrence of acceleration slippage in a case where of acceleration slippage is large of even when not at a low temperature, there existed a problem in that control hydraulic pressure was insufficient and the acceleration slippage could not be suppressed immediately, and smooth acceleration to start running could not be performed.

SUMMARY OF THE INVENTION

To solve the above-described problems, it is an object of the present invention to provide an automotive brake-fluid pressure control apparatus which can ensure a sufficient amount of discharge of a hydraulic pump such as in a case where traction control is initiated, even at low temperatures.

For this reason, according to the present invention, brake fluid expelled from a wheel cylinder is accumulated by a reservoir, and brake fluid which is taken in from a master-cylinder side or is accumulated in the reservoir is pressurized and supplied to a wheel-cylinder side by a self-suction pump. Accordingly, the self-suction pump is operated by a pump-operating device at a predetermined timing immediately prior to performing traction control at a low temperature, taking in brake fluid from the master-cylinder side (being the master cylinder itself or a reservoir thereof), and along with this, a pressure-control valve disposed in the hydraulic circuit is driven so that a path in which a discharge side and an intake side of the self-suction pump are communicated is formed by a communication path forming device.

Consequently, when performing traction control while at a low temperature, brake fluid (to be supplied by the pump) is forcibly caused to circulate in the communicating path immediately prior to traction control. As a result, brake fluid is heated due to the circulation and viscous resistance thereof is reduced. Therefore, brake fluid can be supplied to the wheel cylinder rapidly and sufficiently during the traction control operation by driving the self-suction pump. As a result a sufficient amount of brake fluid is applied to the wheel cylinder in a case where traction control is initiated, for example, when at a low temperature, and so the marked effects of improved responsiveness thereof and the ability to execute traction control reliably are demonstrated.

Additionally, the present invention is not exclusively restricted to the traction control when at a low temperature, and so an effect of being able to perform smooth startoff and acceleration is demonstrated because sufficient control pressure can be assured in advance by causing viscous resistance of brake fluid to be small, even in a case of a control state where high pressure is required when an extent of accelerator slippage is large, for example, at a time of turning or the like.

Moreover, it is preferred that a state in which an amount of discharge of the pump is insufficient is detected by a discharge-state detection device based on a determination that, for example, the temperature of the coolant water or brake-fluid temperature is low or the like, and in a case where such a state has been detected, that control by the pump-operating device and the communication-path forming device is initiated by an initiation-control device.

Consequently, a state in which the discharge capacity is insufficient as for example, when at a low temperature or the like, can be accurately detected, and so there exists an effect in that brake fluid required for control is assured and the required control can be performed when needed.

Moreover, other than a device to make a determination based on the foregoing water temperature, fluid temperature, or the like, a device to detect that hydraulic pressure for control which exceeds pump-discharge performance is required can be employed as the foregoing discharge-state detection device. In specific terms, it is possible to employ a device to detect a control state in which high hydraulic pressure is required, for example, a device to detect a time of turning (by steering angle and vehicle speed or the like), a device to detect a road-surface state where acceleration slippage may easily occur, or the like.

Additionally, it is acceptable that a stopped or extremely low-speed state of a vehicle is detected by a vehicle-state detection device, and in a case where such a stopped or extremely low-speed state of the vehicle has been detected, that control by the pump-operating device and the communication-path forming device are caused to be initiated by the initiation-control device.

That is to say, where traction control is executed, the normal brake system of the control wheel is interrupted, and so when control to precharge brake fluid at a time when the vehicle is traveling is performed, the possibility exists that interference with normal braking may be caused. In this regard, safety of vehicle control is assured according to the present invention by performing the above-described control with restriction to a case where the vehicle stopped or operating at extremely low-speed.

Furthermore, a method to detect a travel state from, for example, a vehicle-speed sensor or the like can be employed as the vehicle-state detection device. Moreover, in an automatic transmission vehicle, a method to determine a stopped or extremely low-speed state of a vehicle according to whether a shift-lever position is "Park" (P) or "Neutral" (N) can be employed.

Additionally, when the foregoing initiation-control device is restricted so as to be operated, for example, in a state wherein a brake pedal is not depressed (such as for example opening of a door lock during rider boarding), a state wherein the possibility of the brake pedal being depressed is low (such as for example immediately after ignition operation), and a state wherein influence on the vehicle is small even if the brake pedal is depressed (for example during a stopped or extremely low-speed state), safety is favorably further enhanced.

It is also preferred that initiation of vehicle travel, except for an extremely low-speed of the vehicle, is detected by a travel-initiation detection device, and in a case where such initiation of vehicle travel has been detected, that control by the pump-operating device and the communication-path forming device are terminated by a termination control device. Through this, interference with normal braking can be prevented more reliably according to the present invention by terminating control to precharge the brake fluid during travel.

The foregoing travel-initiation detection device can determine the initiation of vehicle travel when travel speed detected by a speed-detection device has reached a predetermined speed. Because of this, initiation of vehicle travel must be reliably detected. To this end, a vehicle-speed sensor and wheel-speed sensor are employed as the speed-detection device herein, and moreover, a sensor to detect a revolving speed of a differential/propeller shaft can also be employed.

Furthermore, in an automotive brake fluid pressure control apparatus which performs antiskid control and traction control with a self-suction pump as a common pressure source, it is also acceptable that a switching valve is disposed in a conduit connecting the master-cylinder side and the intake side of the pump, and communication and interruption of the conduit are switched by the switching valve, the supply of brake fluid from the master cylinder or pump to the wheel cylinder of the vehicle wheel, as well as the expulsion of brake fluid from the wheel cylinder to the reservoir, are switched by a pressure-control valve, regulating brake-fluid pressure of the wheel cylinder, and the switching valve is driven to a state where the conduit is communicated by a communication-driving device at the predetermined timing before traction control is executed. In this case, the pump is operated at the foregoing predetermined timing by the pump-operating device, and brake fluid is taken in from the master-cylinder side. Furthermore, the pressure-control valve is driven by the communication-path forming device so that a path is formed whereby brake fluid discharged from the pump reaches the reservoir.

That is to say, the present invention can prevent an insufficient amount of pump discharge in a case where traction control is initiated, for example, at a time of low temperature by causing viscous resistance of brake fluid to be small before initiating traction control in the device to perform antiskid control and traction control.

Additionally, in the foregoing apparatus, it is preferred that, along with supplying brake fluid to a conduit connecting the pressure-control valve and an interrupt valve disposed between the pressure-control valve and master cylinder, the interrupt valve is driven so as to interrupt communication of the pressure-control valve and master cylinder in addition to driving the switching valve and driving the pump operation and the pressure-control valve. That is to say, antiskid control and traction control become possible due to an interruption operation of this interrupt valve.

Furthermore, the foregoing traction control signifies control in which braking force is automatically applied to a driving wheel, in a case where for example, acceleration slippage has occurred.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings.

DETAILED DESCRIPTION OF THE PREFERRED EMBODIMENTS

Embodiments according to the present invention will be described hereinafter with reference to the drawings.
(First embodiment)

Figure 1:
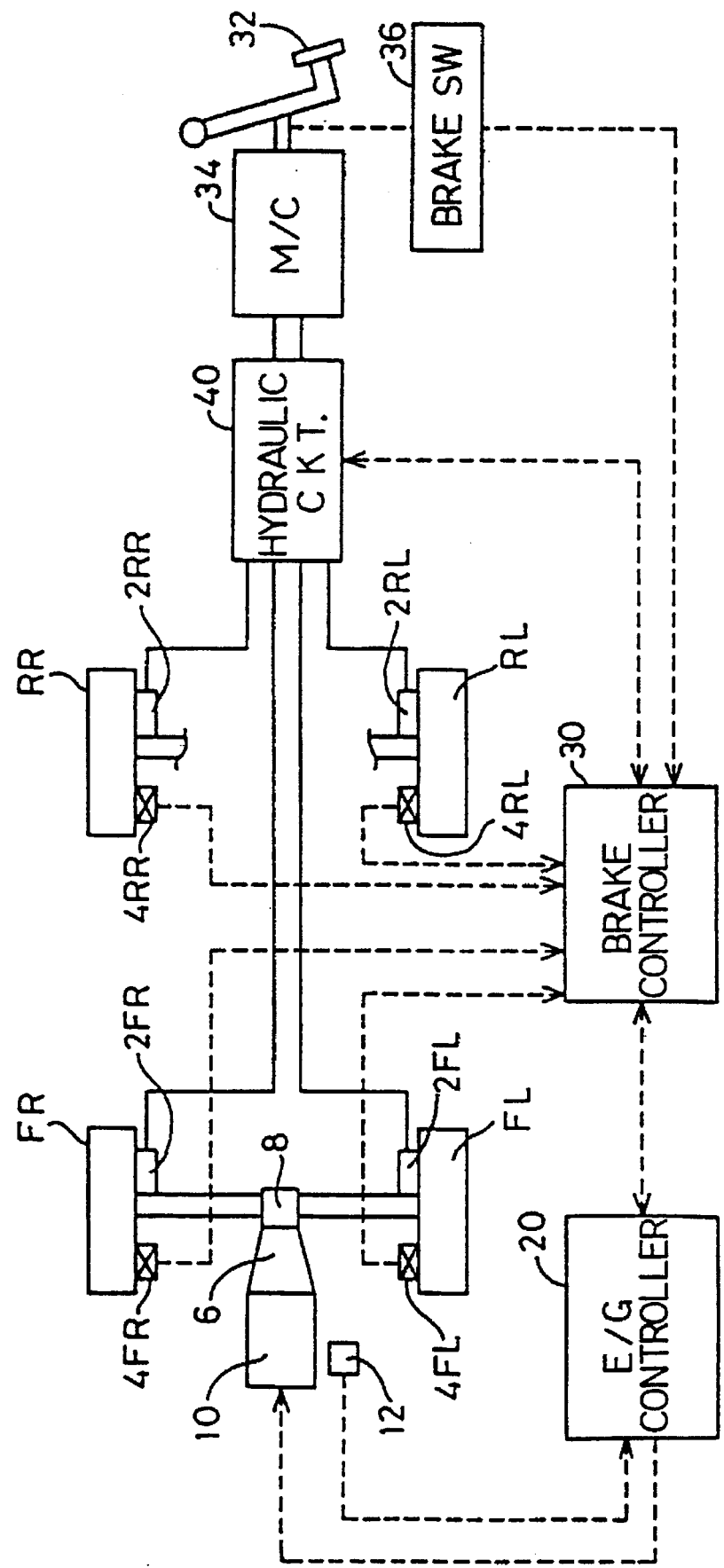
FIG. 1 is a schematic structural view indicating an overall structure of a vehicle control system according to a first embodiment.

FIG. 1 is a schematic structural view indicating an overall structure of a control system of a vehicle in which the present invention is applied. The present embodiment is applied in a front-engine, front-drive (FF) four-wheel vehicle, and uses as a hydraulic pump a self-suction pump to take in brake fluid from a master cylinder (hereinafter termed "M/C") and return the brake fluid to the M/C.

As shown in FIG. 1, several wheels (front left wheel FL, front right wheel FR, rear left wheel RL, and rear right wheel RR) of the vehicle are respectively provided with wheel cylinders (hereinafter termed "W/Cs") 2FL, 2FR, 2RL, and 2RR to apply braking force to the wheels, as well as with speed sensors 4FL, 4FR, 4RL, 4RR to detect the rotating speed of the wheels. Additionally, the left and right front wheels, which are the driving wheels (hereinafter termed simply "driving wheels") FL and FR, receive a drive force from an internal combustion engine 10 connected via a gearbox 6 and differential gear 8, and rotate. This internal combustion engine 10, which is the power source, is provided with a sensor array 12 to detect a running state of rotating speed, amount of intake air, coolant-water temperature, degree of opening of a throttle valve (throttle degree of opening), and the like. Accordingly, detected signals from this sensor array 12 are input to an engine (E/G) controller 20 and used to control the amount of fuel injection and ignition timing of the internal combustion engine 10.

Additionally, detected signals from the speed sensors 4FL to 4RR disposed at the several wheels FL to RR are input to a brake controller 30. By controlling several electromagnetic valves within a hydraulic circuit 40 provided in a hydraulic path extending from M/C 34 to discharge brake fluid to the W/Cs 2FL to 2RR of the several wheels FL to RR according to depression of a brake pedal 32, this brake controller 30 executes antiskid control (hereinafter termed "ABS control") and traction control (hereinafter termed "TRC control") to suppress slippage occurring in the wheels during vehicle braking and vehicle acceleration. In addition to detected signals from the above-described several speed sensors 4FL to 4FR, the brake controller 30 receives and operates according to detected signals from a brake switch (hereinafter termed "brake SW") which assumes an ON state when the brake pedal 32 is operated, a pressure sensor which is disposed within the hydraulic circuit 40 and detects hydraulic pressure within the W/Cs 2FL and 2FR of the driving wheels FL and FR, and so on.

The E/G controller 20 and brake controller 30 are respectively composed of a microcomputer structured primarily of a CPU, ROM, RAM, and the like, and these controllers 20 and 30 are provided with communication devices to transmit and receive detection data from sensors, control data, and so on.

The hydraulic circuit 40 will be described next.

Figure 2:
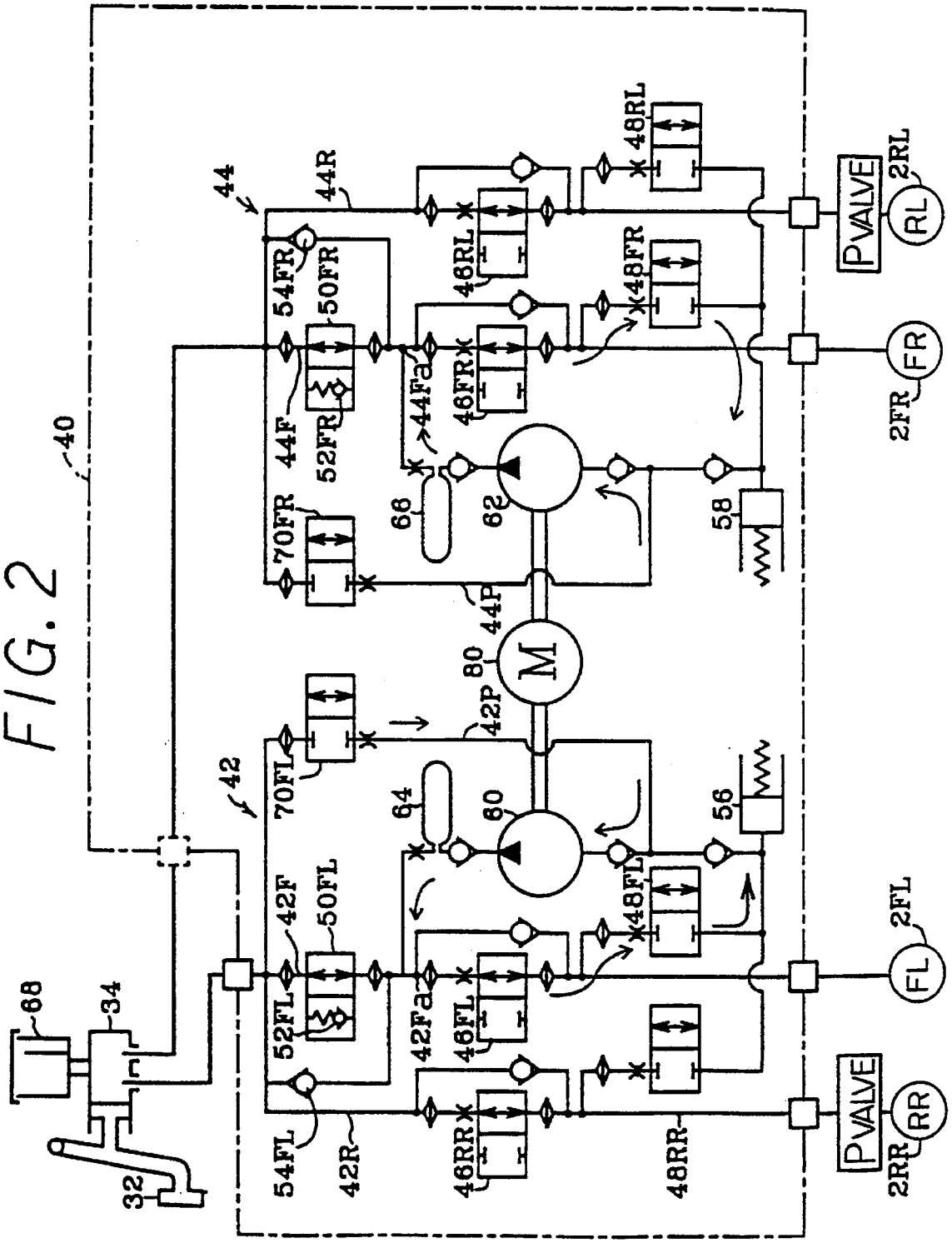
FIG. 2 is a circuit diagram indicating a structure of a hydraulic circuit according to the first embodiment.
Figure 3:
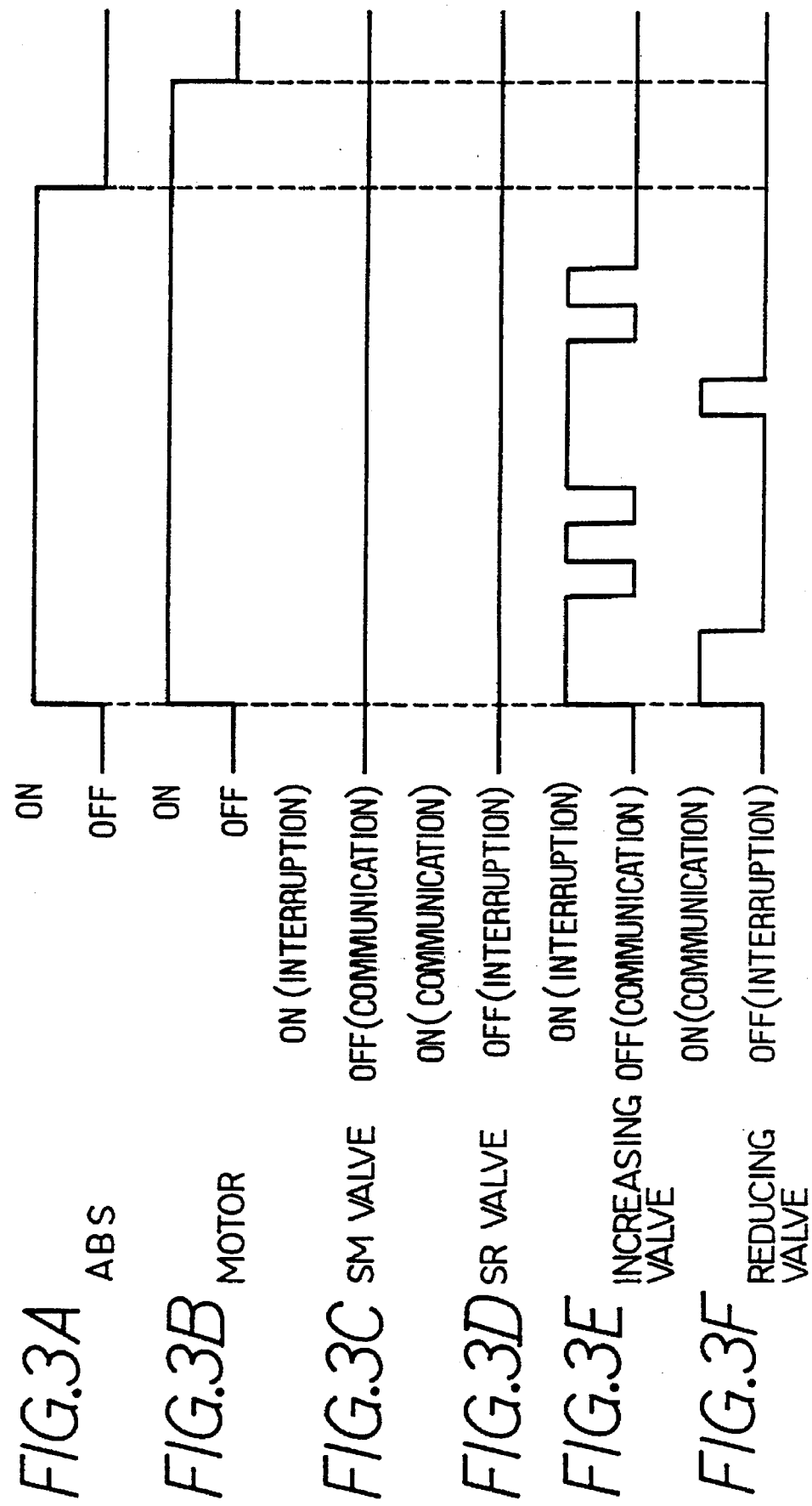
FIGS. 3A, 3B, 3C, 3D, 3E and 3F are timing charts indicating processing of ABS control according to the first embodiment.
Figure 4:
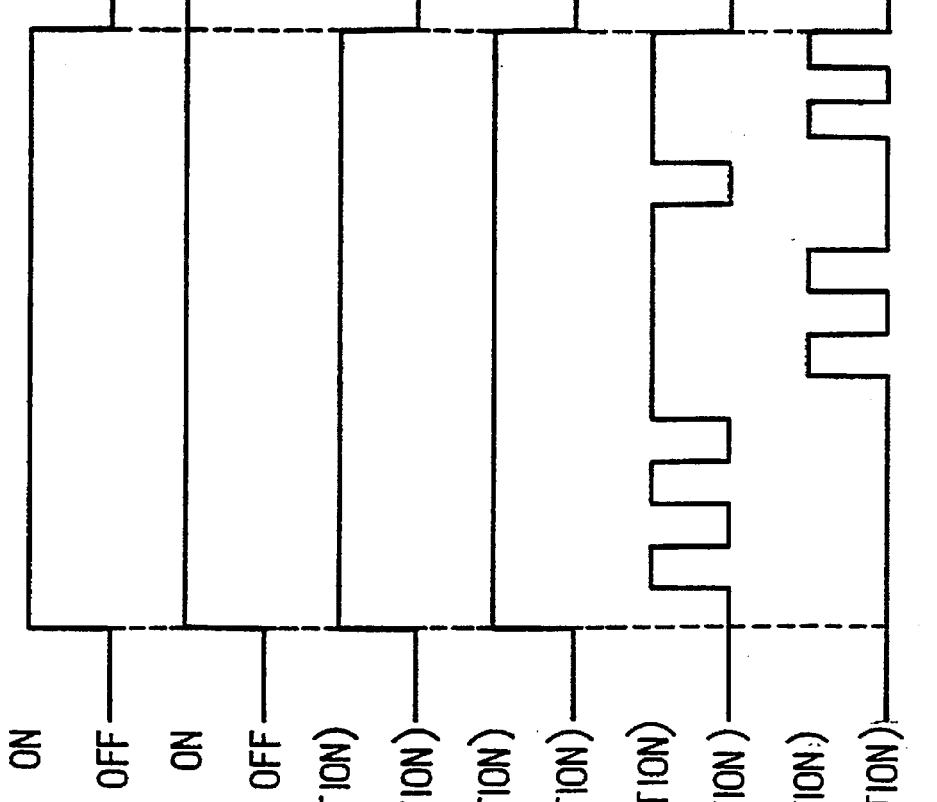
FIGS. 4A, 4B, 4C, 4D, 4E and 4F are timing charts indicating processing of TRC control according to the first embodiment.

As shown in FIG. 2, the hydraulic circuit 40 is provided with dual-system hydraulic paths 42 and 44 to supply brake fluid sent under pressure from two oil paths of the M/C 34 to the front-left wheel FL and rear-right wheel RR and to the front-right wheel FR and rear-left wheel RL, respectively. Accordingly, of these hydraulic paths 44 and 42, holding valves (pressure-increasing control valves) 46RL and 46RR, which are switchable to a pressure-increasing position to be communicated with the paths 44R and 42R and to a holding position to interrupt the paths 44R and 42R as well as pressure-reducing valves (pressure-reducing control valves) 48RL and 48RR to expel brake fluid within the respective W/Cs 2RL and 2RR, are provided in the hydraulic paths 44R and 42R reaching the W/Cs 2RL and 2RR of the left and right rear wheels which are driven wheels (hereinafter termed simply "driven wheels") RL and RR.

Moreover, the holding valves 46RL and 46RR normally assume a pressure-increasing position, and are switched to a holding position by electrical conduction from the brake controller 30. Additionally, the pressure-reducing valves 48RL and 48RR normally assume an interrupted state, and are switched to a communicated state to expel brake fluid within the W/Cs 2RL and 2RR by electrical conduction from the brake controller 30.

Meanwhile, of the foregoing respective hydraulic paths 42 and 44, holding valves 46FL and 46FR and pressure-reducing valves 48FL and 48FR are provided as the above-described control valves in the hydraulic paths 42F and 44F reaching the W/Cs 2FL and 2FR of the left and right front wheels FL and FR which are the driving wheels, similarly to the hydraulic paths 44R and 42R of the driven wheel side; along with this, master-cylinder cutoff valves (SM valves) 50FL and 50FR are disposed at the M/C 34 side of the respective holding valves 46FL and 46FR as the above-described switching valves to communicate and interrupt the paths 42F and 44F.

An interrupted position of these SM valves 50FL and 50FR is a position where relief valves 52FL and 52FR therein is communicated when hydraulic pressure of the holding valve 46FL and 46FR side reaches an upper-limit value or more, which is larger the hydraulic pressure of the M/C 34 side by a predetermined value, and the relief valves 52FL and 52FR limit hydraulic pressure of the holding valve 46FL and 46FR side to the upper-limit value or less.

Accordingly, relief valves 54FL and 54FR, which are communicated when hydraulic pressure of the M/C 34 side has become larger than the hydraulic pressure of the holding valve 46FL and 46FR side and which supply pressurized fluid output from the M/C 34 to the holding valve 46FL and 46FR side, are connected in parallel with SM valves 50FL and 50FR. The SM valves 50FL and 50FR normally assume a communicated state, and are switched to an interrupted state by electrical conduction from the brake controller 30.

Additionally, reservoirs 56 and 58, which temporarily accumulate brake fluid expelled from the pressure-reducing valves 48FL and 48RR and the pressure-reducing valves 48FR and 48RL, are provided in the hydraulic paths 42 and 44, and hydraulic pumps 60 and 62, which pressurize and send the brake fluid thereof to a hydraulic path 42Fa between the SM valve 50FL and holding valve 46FL and to a hydraulic path 44Fa between the SM valve 50FR and holding valve 46FR, respectively, are also provided. Accumulators 64 and 66 to suppress internal hydraulic pulsation are disposed in discharge paths of brake fluid from the respective hydraulic pumps 60 and 62.

Furthermore, supply paths 42P and 44P to supply brake fluid directly to the hydraulic pumps 60 and 62 from a reservoir 68 provided in an upper portion of the M/C 34 via the M/C 34 during execution of brake TRC control which will be described later are provided in the respective hydraulic paths 42 and 44; provided in these supply paths 42P and 44P are reservoir cutoff valves (SR valves) 70FL and 70FR to communicate and interrupt the paths thereof.

The SR valves 70FL and 70FR normally assume an interrupted state, and are switched to a communicated state by electrical conduction from the brake controller 30. In addition, the respective hydraulic pumps 60 and 62 are driven via a motor 80 during execution of brake TRC control.

ABS control and TRC control performed by the above-described brake controller 30 will be described hereinafter.

In a case where ABS control and TRC control are not performed, normally all electromagnetic valves of the hydraulic circuit 40 go off. In specific terms, the SM valves 50FL and 50FR are at a communicated position and the SR valves 70FL and 70FR are at an interrupted position, which are electromagnetic valves to switch to TRC control, and the pressure-increasing valves 46FL and 46FR are at a communicated position and the pressure-reducing valves 48FL and 48FR are at an interrupted position, which are the pressure-control valves of the W/Cs 2FL and 2FR of the driving wheel.

(1) ABS control

When slippage is generated at the several vehicle wheels FL to RR by a sudden braking operation by a driver on, for example, a low-μ road, as shown in FIGS. 3A to 3F, ABS control is initiated and the motor 80 is driven to cause the pumps 60 and 62 to operate. Along with this, brake-fluid pressure within the respective W/Cs 2FL to 2RR is switched appropriately to a state of pressure reduction, holding, or pressure increasing in correspondence with a slippage state of the respective wheels FL to RR by respectively switching the pressure-increasing valves 46FL to 46RR and the pressure-reducing valves 48FL to 48RR on and off (conduction or nonconduction).

In specific terms, when it is determined that the vehicle wheels exhibit a tendency to lock, the pressure-control valves are controlled at a pressure-reducing position (pressure-increasing valve ON: interrupted, pressure-reducing valve OFF: communicated), and the hydraulic pressure of the W/Cs 2FL to 2RR is reduced, preventing locking of the vehicle wheels. At this time, pressure-reduced brake fluid from the W/Cs 2FL to 2RR is expelled via the pressure-reducing valves 48FL and 48FR to the reservoirs 56 and 58, and moreover, brake fluid accumulated in the reservoirs 56 and 58 is caused to be returned to the M/C 34 side by driving the motor 80.

Accordingly, when it is determined that the tendency of the vehicle wheels to lock has been eliminated, the pressure-control valves of the W/Cs 2FL to 2RR are controlled at a pressure-increasing position (pressure-increasing valve OFF: communicated, pressure-reducing valve OFF: interrupted), and the W/C hydraulic pressure is caused to increase. Because the vehicle wheels will exhibit a tendency to lock if the W/C hydraulic pressure is caused to increase suddenly, the pressure-control valves are controlled at a holding position (pressure-increasing valve ON: interrupted, pressure-reducing valve OFF: interrupted) as well, and thus W/C hydraulic pressure is held. That is, by switching the pressure-increasing position and the holding position periodically, W/C hydraulic pressure increases gradually, thereby locking of the vehicle wheels is prevented and stability of the vehicle is assured.

Additionally, the motor 80 is driven for a predetermined interval and the brake fluid in the reservoirs 56 and 58 is pumped out after termination of ABS control in order to perform subsequent ABS control smoothly.

(2) TRC control

When acceleration slippage is generated at the driving wheels FL and FR by a sudden accelerator operation by the driver on, for example, a low-μ road, E/G TRC control to suppress output torque of the internal combustion engine 10 are initiated by outputting to the E/G controller 20 an instruction to reduce the amount of fuel injection or to retard ignition timing, and along with this, brake TRC control is initiated.

As shown in FIGS. 4A to 4F, this brake TRC control drives the motor 80 to cause the pumps 60 and 62 to be operated. Along with this, braking force is applied to the driving wheels FL and FR and acceleration slippage is suppressed by switching on (i.e., electrical conduction) the SM valves 50FL and 50FR and the SR valves 70FL and 70FR and by switching on and off the pressure-increasing valves 46FL and 46FR and the pressure reducing valves 48FL and 48FR.

In specific terms, the pressure-increasing valves 46FL and 46FR and pressure-reducing valves 48FL and 48FR are driven so that W/C hydraulic pressure is appropriately switched to pressure reduction, holding, or pressure increasing, and acceleration slippage is suppressed.

Additionally, the motor 80 is driven for a predetermined interval and brake fluid in the reservoirs 56 and 58 is pumped out after termination of TRC control in order to perform normal braking operation smoothly.

Figure 5:
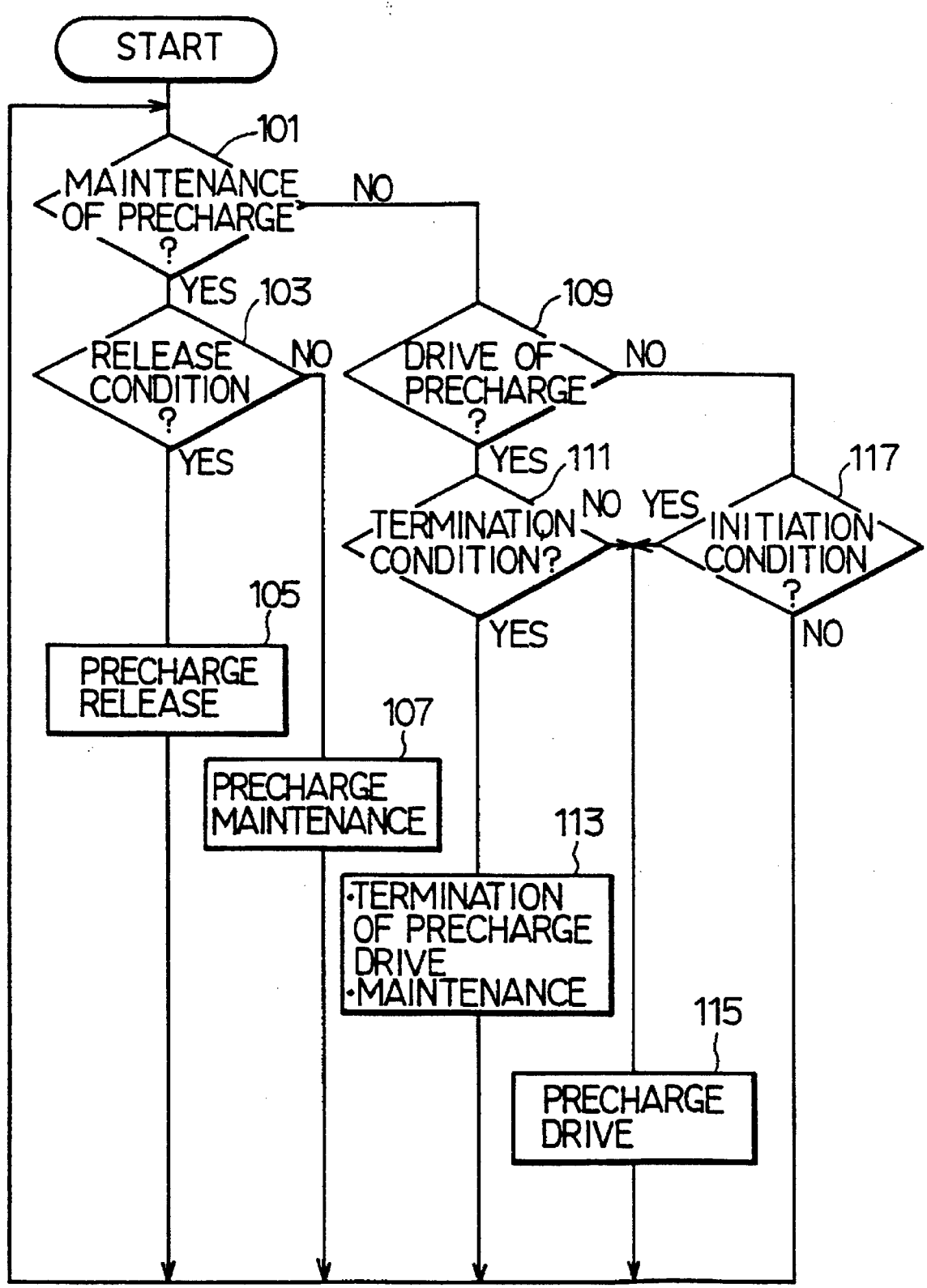
FIG. 5 is a flowchart indicating processing of precharge control according to the first embodiment.
Figure 6:
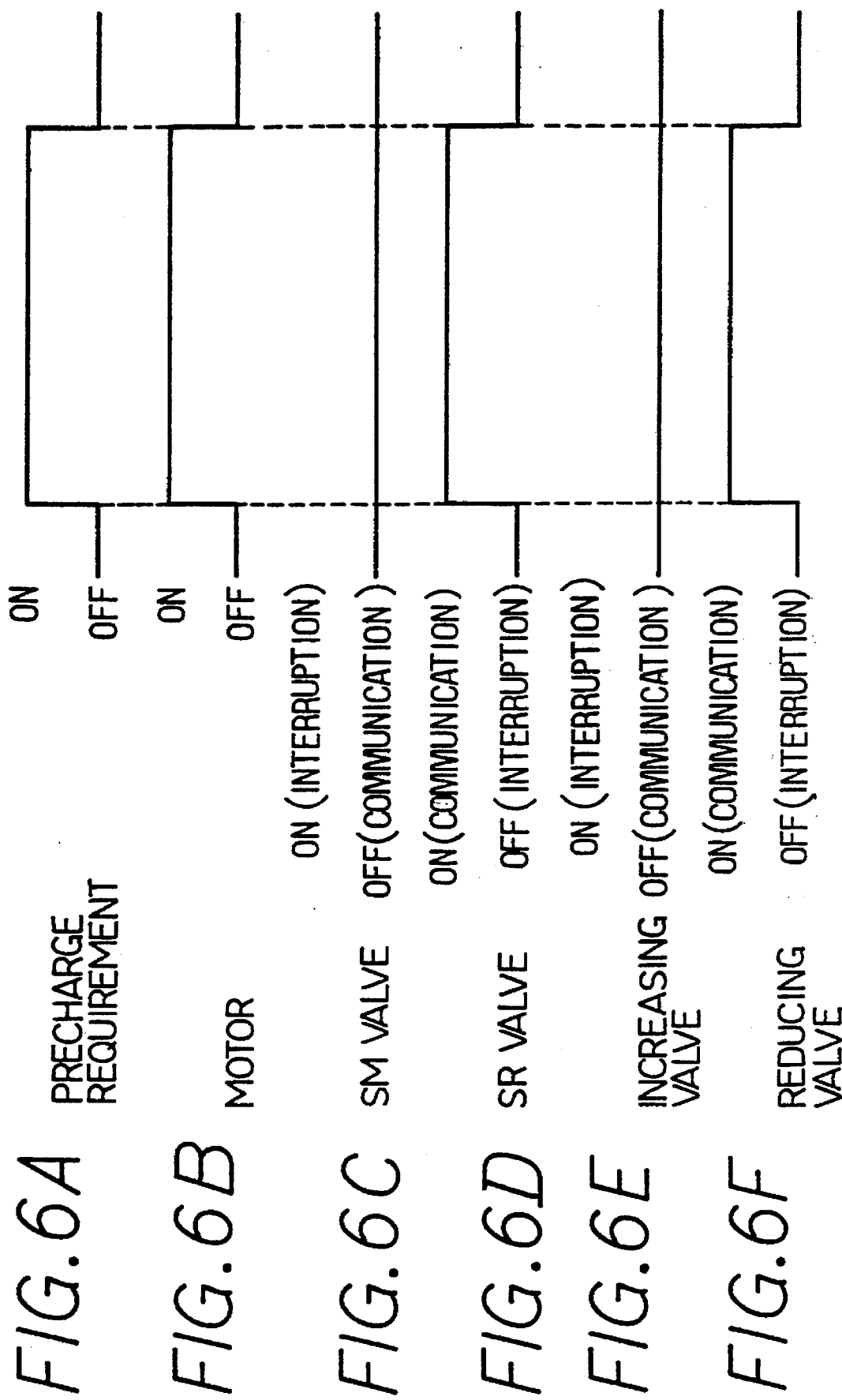
FIGS. 6A, 6B, 6C, 6D, 6E and 6F are timing charts indicating processing of precharge control according to the first embodiment.

Precharge processing executed by this brake controller 30 will be described in detail hereinafter with reference to the flowchart shown in FIG. 5 and the timing chart shown in FIGS. 6A to 6F and FIGS. 7A to 7F. FIG. 5 indicates processing executed, for example, every 5 ms, FIGS. 6A to 6F indicate a case of execution of precharge (precharge control), and FIGS. 7A to 7F indicate a case of release of precharge (precharge release control).

This precharge control accumulates brake fluid in the reservoirs 56 and 58 before performing brake TRC control when at a low temperature and ensures an amount of pump discharge employed in brake TRC control when at a low temperature in order to improve responsiveness. In specific terms, the motor 80 is switched on, the SR valves 70FL and 70FR and pressure-reducing valves 48FL and 48FR are communicated, and brake fluid is sent in the direction of the arrows of FIG. 2 in a case of when precharge control is in progress (i.e., a state of gradual accumulation in the reservoirs 56 and 58).

As shown in FIG. 5, in step 101 initiated in a case where, for example, ignition switch is turned on, determination of whether maintenance of precharge control is in progress is made according to, for example, a flag indicating that the maintenance of precharge control is in progress. If an affirmative determination is made herein, processing advances to step 103; meanwhile, if a negative determination is made, processing advances to step 109. This "maintenance of precharge control in progress" signifies a state wherein drive of the motor 80 and the like to perform precharging has already been executed and a required amount of brake fluid has been accumulated and held in the reservoirs 56 and 58; at this time, the motor 80 has already been stopped and the pressure-reducing valves 48FL and 48FR are held in an interrupted state.

In step 103, it is determined whether a precharge release condition has been fulfilled. If an affirmative determination is made herein, processing advances to step 105; meanwhile, if a negative determination is made, processing advances to step 107. This "precharge release condition" signifies a condition where, for example, water temperature or oil temperature has become a predetermined value or more, a condition where a traveling state has been changed (for example travel of the vehicle has been initiated), or the like.

Figure 7:
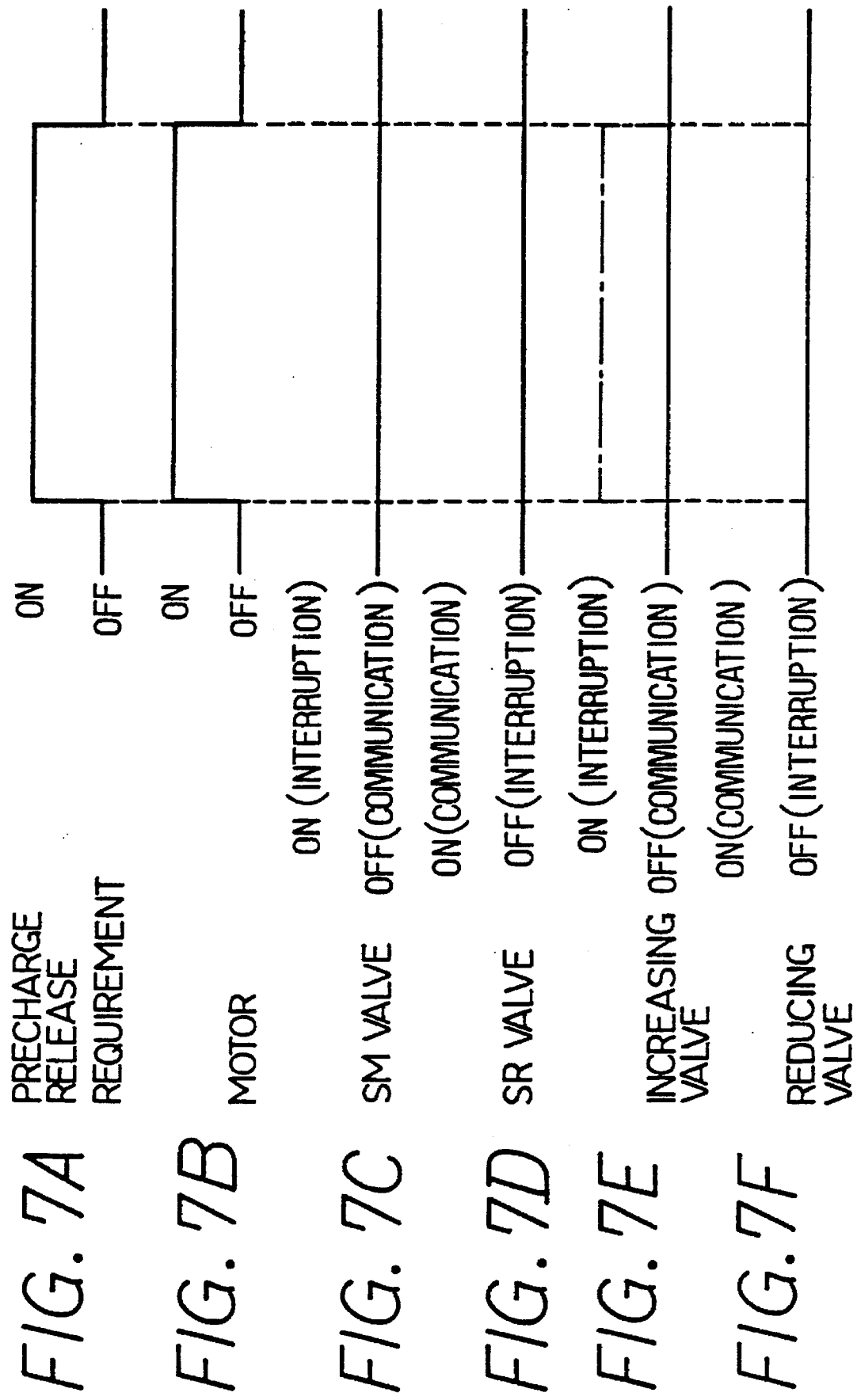
FIGS. 7A, 7B, 7C, 7D, 7E and 7F are timing charts indicating processing of release of precharge control according to the first embodiment.

In step 105, the precharge release condition has been fulfilled, and so precharge release control is performed and processing returns to the foregoing step 101, as shown in FIGS. 7A to 7F. That is to say, processing to eliminate brake fluid from the reservoirs 56 and 58 is performed by driving the motor 80 in a state where the pressure-reducing valves 48FL and 48FR have been interrupted for a predetermined interval after a request for precharge release. In addition, the controlling of the pressure-increasing valves as indicated by the dotted lines in FIG. 7E is to avoid applying unnecessary application pressure from the pumps 60 and 62, and thus a minute hydraulic pressure is not generated in the several vehicle wheels during brake fluid elimination from the reservoirs 56 and 58 by the motor 80.

Additionally, separately from this precharge release control, it is also acceptable to drive the motor 80 at a state of initialization check of the apparatus in order to reliably release precharging.

Meanwhile, in step 107, the precharge release condition has not been fulfilled, and so the state of the maintenance of precharge control is held without change, and processing returns to the foregoing step 101.

Additionally, in step 109, to which processing advances when it is determined in step 101 that the maintenance of precharge control is not in progress, it is determined whether drive for precharge control is presently in progress. If an affirmative determination is made herein, processing advances to step 111; meanwhile, if a negative determination is made, processing advances to step 119.

In step 111, it is determined whether a termination condition for precharge control has been fulfilled. If an affirmative determination is made herein, processing advances to step 113; meanwhile, if a negative determination is made, processing advances to step 117. This "precharge control termination condition" is a case where, for example, a predetermined interval has elapsed since initiation of precharging, or a case where not less than a predetermined temperature somewhat lower than the water temperature or oil temperature of the above-described precharge release condition has been obtained, and the predetermined temperature may be varied in accordance with a running state.

In step 113, the motor 80 is switched off, the SR valves 70FL and 70FR are interrupted, the pressure-reducing valves 48FL and 48FR are also interrupted, and precharge control is terminated, and along with this, maintenance state of precharge control is established and processing is returned to step 101.

Meanwhile, in step 115, the motor 80 is switched on, the SR valves 70FL and 70FR are caused to be communicated, the pressure-reducing valves 48FL and 48FR are also caused to be communicated, precharge control is executed, and processing is returned to step 101. The interval for which precharge control is executed is established to be the predetermined interval wherein the required amount of brake fluid is accumulated in the reservoirs 56 and 58, and so precharge control is terminated and processing for the maintenance of precharge control is performed in a case where this interval has ended.

Additionally, in step 117, to which processing advances when it is determined in the foregoing step 109 that drive for precharge control is not in progress, it is determined whether the initiation condition for precharge control has been fulfilled. It is determined whether a condition wherein, for example, water temperature and oil temperature are a predetermined value or less and the vehicle is in a stopped or extremely low-speed state has been fulfilled. If an affirmative determination is made herein, processing advances to the foregoing step 115, and similarly precharge control is executed and processing is returned to step 101. Meanwhile, if a negative determination is made, execution is returned to step 101 without change.

In this way, according to the present embodiment, when it is considered that viscous resistance of brake fluid is high because of low temperature, as in, for example, a case where coolant-water temperature is low or a case where brake-fluid temperature is low, precharge control to accumulate brake fluid in the reservoirs 56 and 58 is performed before performing brake TRC control. That is to say, pressure-increasing characteristics are improved to a level of ordinary temperature by accumulating (heated) brake fluid within the reservoirs 56 and 58 by precharge control. Consequently, a sufficient amount of pump discharge can be assured even in a case where brake TRC control is initiated at a time of low temperature, and so improved effects are demonstrated in that responsiveness is improved and traction control can reliably be performed.

Additionally, when the brake fluid accumulated in the reservoirs 56 and 58 by the precharge control is allowed to remain unchanged, there exists the possibility that a pressure-reduction delay for the W/Cs 2RR to 2RL may be generated, and the vehicle wheel speeds may fall deeply and behavior of the vehicle wheels may become unstable when ABS control is initiated. But according to the present embodiment, an accumulated brake fluid is expelled by precharge release control in a case where a vehicle-travel state has been detected, and so ABS control can favorably be performed.

Furthermore, the present embodiment is not exclusively restricted to traction control at a time of low temperature, but can assure sufficient hydraulic pressure for control even in a case of a control state requiring high hydraulic pressure when an extent of acceleration slippage is large, such as during turning or the like, and so there is also an effect of being able to perform smooth startoff and acceleration.

The above-described embodiment determines the execution and release of precharge control based on water temperature, oil temperature, and the like, but other than this, it is possible to employ, for example, a device to detect a time of turning (by steering angle, vehicle speed, or the like), a device to detect a state where high hydraulic pressure is required, such as a device to detect a state of a road surface where acceleration slippage may easily occur, namely, a device to detect that control hydraulic pressure which exceeds pump-discharge capacity is required.

Additionally, according to the above-described precharge control, the pressure-increasing valves 46FL and 46FR and pressure-reducing valves 48FL and 48FR are caused to be communicated and brake fluid is accumulated in the reservoirs 56 and 58. In this case, the intake side and discharge side of the pumps 60 and 62 are communicated, and so brake fluid is recirculated through this communication path.

During this recirculation of brake fluid, the brake fluid is warmed by heat-generation of the pumps 60 and 62 and the like, and the brake-fluid temperature rises (preheating). The viscous resistance of the brake fluid is lowered because of this, and as a result, improvement of discharge performance of the pumps 60 and 62 when at a time of low temperature can be attempted with respect to this point as well.

Pump discharge performance is improved by the foregoing preheating in the second and subsequent embodiments which will be described hereinafter (although particular description is not provided).

(Second embodiment)

An automotive brake fluid control apparatus according to a second embodiment will be described hereinafter.

The present embodiment is applied to an FF vehicle having a hydraulic circuit to perform ABS control and TRC control, and utilizes an M/C self-suction and M/C return form as the hydraulic circuit. In particular, the hydraulic circuit according to the present embodiment utilizes a switching valve (3/2 valve) in which an SM valve and SR valve are integrated, differing from the SM valve and SR valve of the foregoing first embodiment, and.

Figure 8:
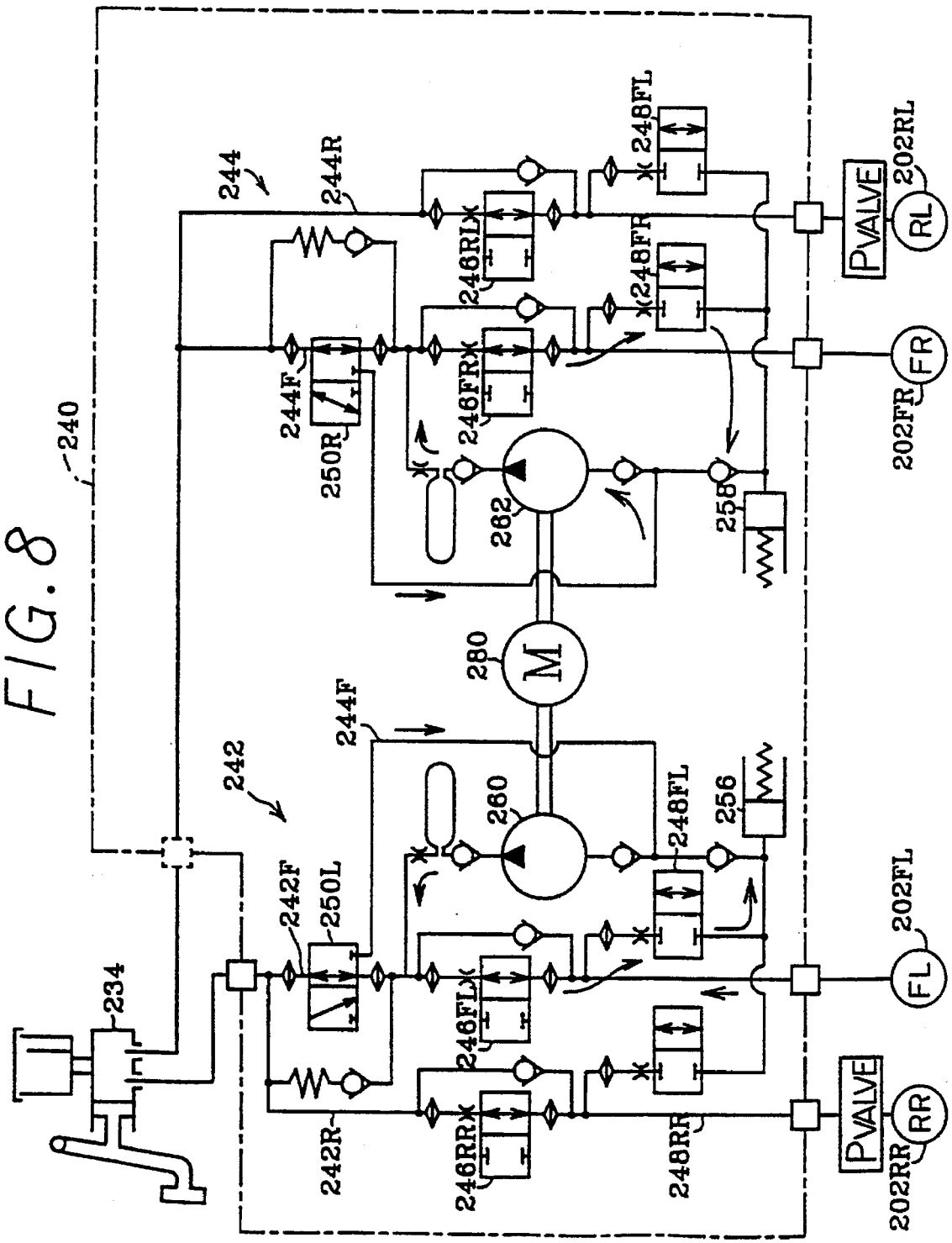
FIG. 8 is a circuit diagram indicating a structure of a hydraulic circuit according to a second embodiment.
Figure 9:
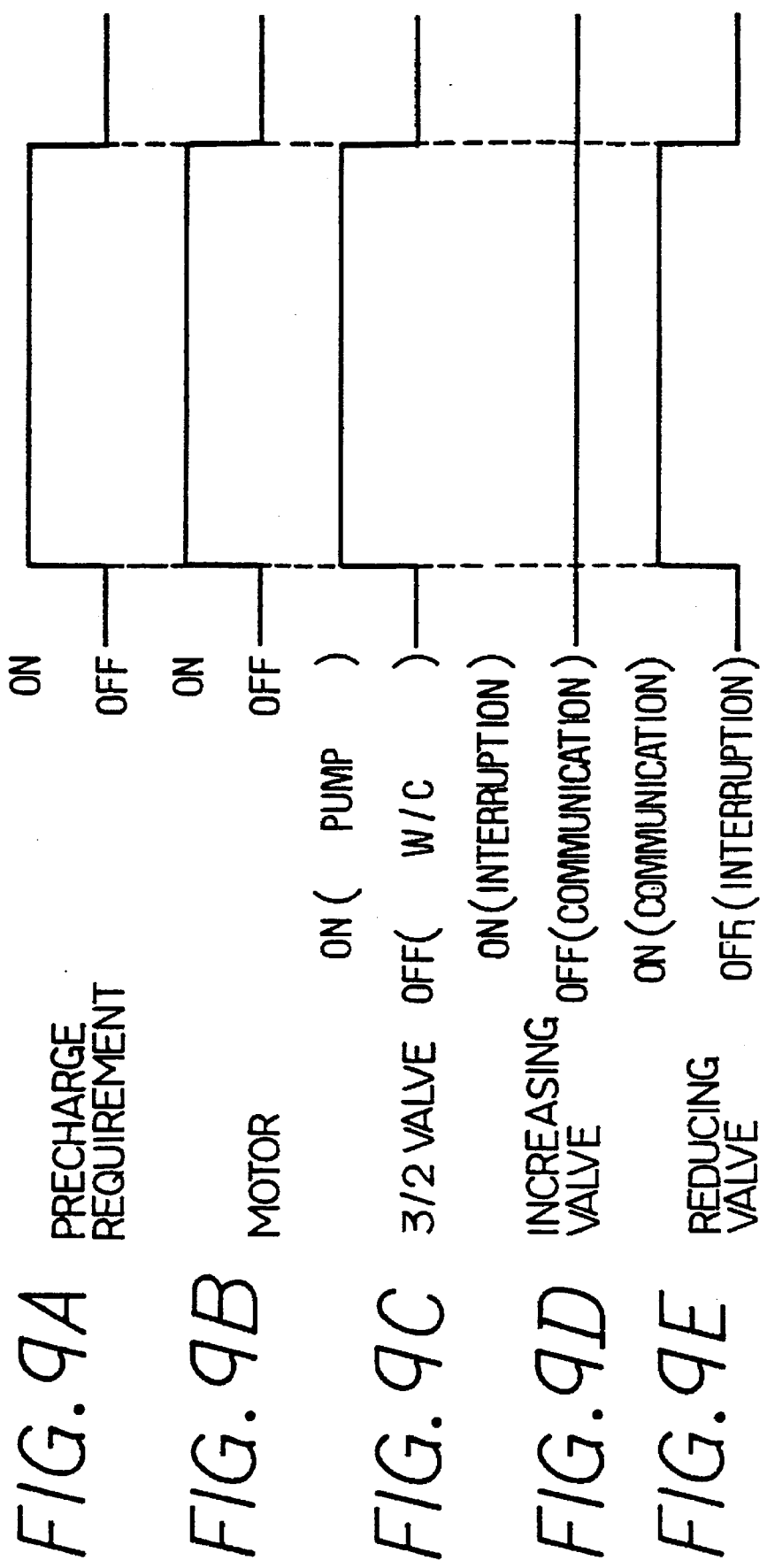
FIGS. 9A, 9B, 9C, 9D, and 9E are timing charts indicating processing of precharge control according to the second embodiment.

In a hydraulic circuit 240 according to the present embodiment, as shown in FIG. 8, pressure-increasing valves 246RL and 246RR and pressure-reducing valves 248RL and 248RR are provided, respectively, in hydraulic paths 244R and 242R reaching W/Cs 202RL and 202RR of driven wheels RL and RR among several hydraulic paths 244 and 242 connected to a M/C 234.

Meanwhile, pressure-increasing valves 246FL and 246FR and pressure-reducing valves 248FL and 248FR are also disposed, respectively, in hydraulic paths 244F and 242F reaching W/Cs 202FL and 202FR of driving wheels FL and FR. Additionally, switching valves 250L and 250R, which are 3/2 electromagnetic valves to connect bidirectional paths among the tridirectional hydraulic paths, are disposed in the M/C 234 side of the respective pressure-increasing valves 246FL and 246FR. That is, a first position in which the M/C 234 side and pressure-increasing valves 246FL and 246FR are communicated is established in a case where these switching valves 250L and 250R have been switched off, and a second position in which the M/C 234 side and a pump 260 intake side are communicated is established in a case where switching valves 250L and 250R have been switched on.

Furthermore, reservoirs 256 and 258 to temporarily accumulate brake fluid expelled from the pressure-reducing valves 248FL and 248FR are provided in the respective hydraulic paths 242 and 244, and pumps 260 and 262 to send the brake fluid thereof under pressure to the paths between the respective switching valves 250L and 250R and the respective pressure-increasing valves 246FL and 246FR are provided.

A drive method of precharge control in an apparatus according to the present embodiment will be described hereinafter with reference to FIGS. 9A to 9E. Control according to the present embodiment, similarly to the foregoing first embodiment, includes performing precharge control and accumulating a required amount of brake fluid before performing brake TRC control. Because precharge release control is similar to the foregoing first embodiment, description thereof will be omitted in other embodiments hereinafter as well.

In a case where, for example, water temperature or oil temperature is at a low-temperature state, a condition to execute precharge control has been fulfilled, and a precharge request has been made, the switching valves 250L and 250R are switched to the second position and the M/C 234 side and pump 260 and 262 intake sides are respectively caused to be communicated. Additionally, the pressure-increasing valves 246FL and 246FR are switched off and held in a communicated state, and the pressure-reducing valves 248FL and 248FR are switched on and switched to a communicated state. Accordingly, a motor 280 is switched on in this state.

As a result thereof, as shown by the arrows in FIG. 8, brake fluid is accumulated from the M/C 234 side and via the respective pressure-increasing valves 246FL and 246FR and pressure-reducing valves 248FL and 248FR, in the respective reservoirs 256 and 258 due to the pumps 260 and 262.

In this way, the FF vehicle is provided with a hydraulic circuit 240 having self-suction pumps 260 and 262 and switching valves 250L and 250R (to switch a hydraulic path to 3/2 directions), and the present embodiment performs ABS control and TRC control by using the hydraulic circuit 240. In this case, brake fluid can be accumulated in reservoirs 256 and 258 before performing brake TRC control when at a low temperature, and so an effect is demonstrated in which a sufficient amount of pump discharge for brake TRC control can be assured, similarly to the foregoing first embodiment.

(Third embodiment)

An automotive brake fluid control apparatus according to a third embodiment will be described hereinafter.

The present embodiment is applied to an FF vehicle having a hydraulic circuit to perform ABS control and TRC control, and utilizes a reservoir self-suction and reservoir return as a hydraulic circuit.

Figure 10:
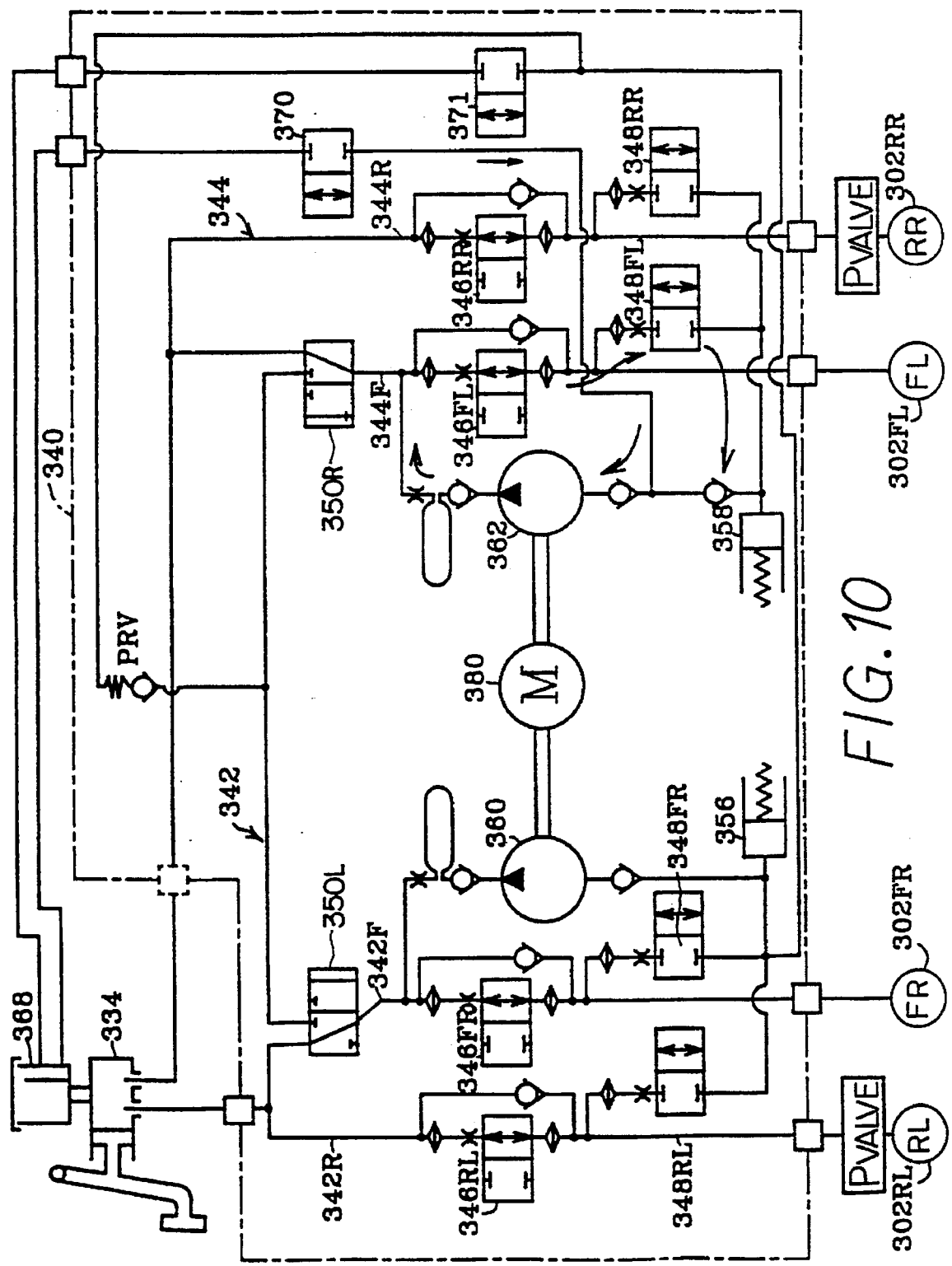
FIG. 10 is a circuit diagram indicating a structure of a hydraulic circuit according to a third embodiment.
Figure 11:
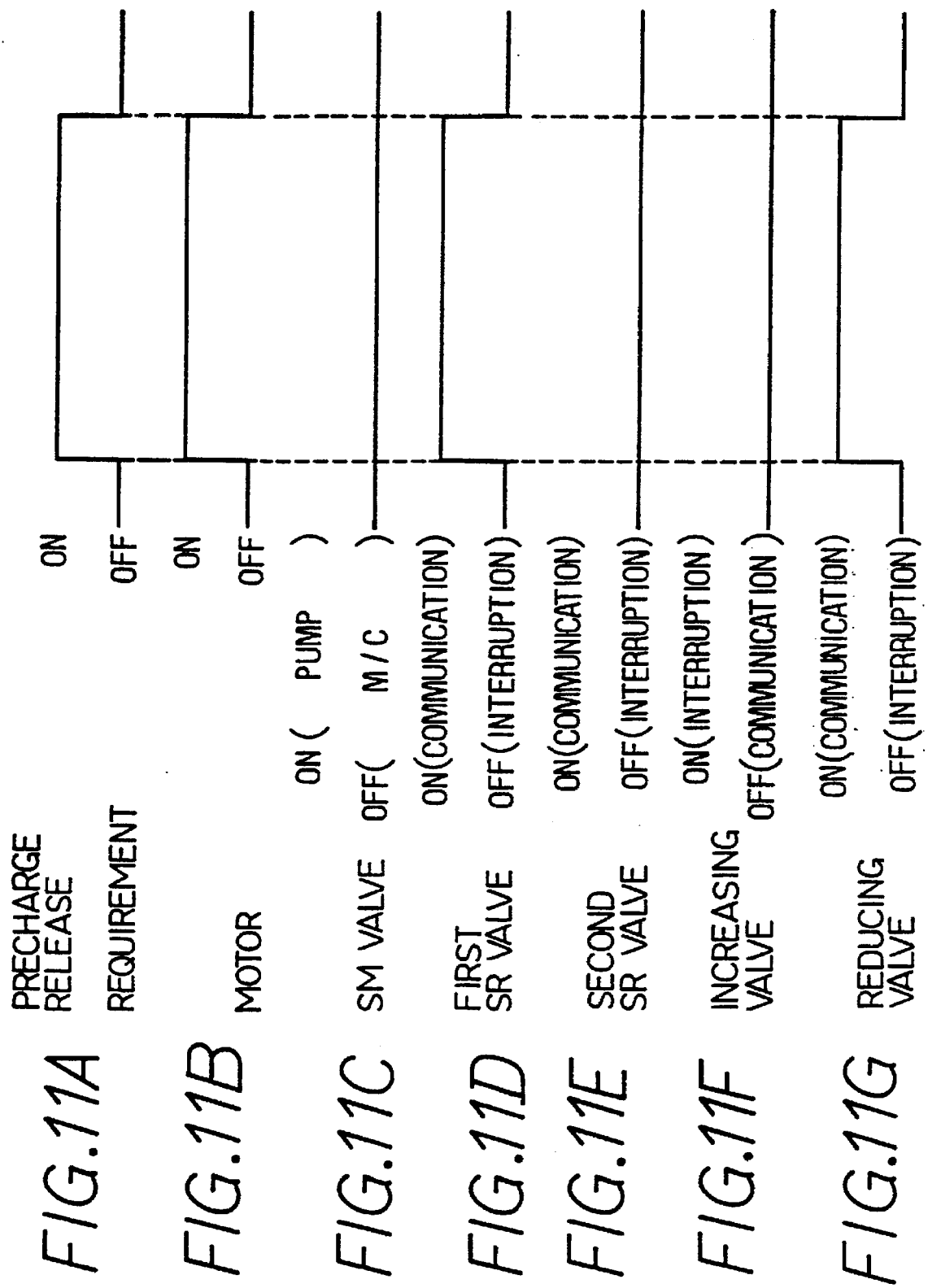
FIGS. 11A, 11B, 11C, 11D, 11E, 11F and 11G are timing charts indicating processing of precharge control according to the third embodiment.

In a hydraulic circuit 340 according to the present embodiment, as shown in FIG. 10, pressure-increasing valves 346RL and 346RR and pressure-reducing valves 348RL and 348RR are provided respectively in hydraulic paths 344R and 342R reaching W/Cs 302RL and 302RR of driven wheels RL and RR among left and right several hydraulic paths 344 and 342 connected to a M/C 334.

Meanwhile, pressure-increasing valves 346FL and 346FR and pressure-reducing valves 348FL and 348FR are also disposed respectively in hydraulic paths 344F and 342F reaching W/Cs 302FL and 302FR of driving wheels FL and FR. Additionally, switching valves (SM valves) 350L and 350R, which are 3/2 electromagnetic valves to connect bidirectional paths among tridirectional hydraulic paths, are disposed in the M/C 334 side of the respective pressure-increasing valves 346FL and 346FR. That is to say, a first position in which the M/C 334 side and pressure-increasing valves 346FL and 346FR are communicated is established in a case where these SM valves 350L and 350R have been switched off, and a second position in which the an intake side of one pump 362 and an intake side of another pump 360 are communicated is established in a case where the SM valves 350L and 350R have been switched on.

Furthermore, reservoirs 356 and 358 (of the W/C side) that temporarily accumulate brake fluid expelled from the pressure-reducing valves 348FL and 348FR are provided in the respective hydraulic paths 342 and 344.

According to the present embodiment, a first SR valve 370 is disposed in a path reaching from a reservoir 368 connecting to the M/C 334 to the pump 362 and communicates and interrupts the path which takes in brake fluid from the reservoir 368 of the M/C 334, and a second SR valve 371 is disposed in a path reaching from the reservoir 368 to the pressure-reducing valves 348FR, i.e., in a path to cause to return brake fluid to the reservoir 368. Additionally, a path to return brake fluid from the SM valves 350FL and 350FR via a pressure-regulating valve PRV is connected to a path in which this second SR valve 371 is disposed.

A drive method of precharge control in an apparatus according to the present embodiment will be described hereinafter with reference to FIGS. 11A to 11G. Control according to the present embodiment, similarly to the above-described first embodiment, performs precharge control and accumulates a required amount of brake fluid before performing brake TRC control at a time of a low temperature.

In a case where, for example, water temperature or oil temperature is at a low-temperature state, a condition to execute precharge control has been fulfilled, and a precharge request has been made, the first SR valve 370 is switched on and set to a communicated state, and along with this, the second SR valve 371 is switched off and held in an interrupted state. Additionally, the SM valves 350L and 350R are switched off. Moreover, the pressure-increasing valves 46FL and 346FR are switched off and held in a communicated state, and the pressure-reducing valves 348FL and 348FR are switched on and switched to a communicated state. Accordingly, a motor 380 is switched on in this state.

As a result thereof, as shown by the arrows in FIG. 10, brake fluid is accumulated in the reservoir 358 of the W/C 302FL side from the reservoir 368 of the M/C 334 side and via the first SR valve 370 and the pressure-increasing valve 346FL and pressure-reducing valve 348FL, due to the pump 362. Accordingly, when performing the brake TRC control, the SM valves 350L and 350R are switched to the second position to supply the brake fluid to the W/Cs 302FL and 302FR.

In this way, the FF vehicle is provided with a hydraulic circuit 340 having pumps 360 and 362, SM valves 350L and 350R (to switch a hydraulic path to 3/2 directions), and SR valves 370 and 371, and the like, and the present embodiment performs ABS control and TRC control by using the hydraulic circuit 340. In this case, brake fluid can be accumulated in the reservoir 358 before performing brake TRC control when at a low temperature, and so an effect is demonstrated in which a sufficient amount of pump discharge for brake TRC control can be assured, similarly to the above-described first embodiment.

(Fourth embodiment)

An automotive brake fluid control apparatus according to a fourth embodiment will be described hereinafter.

The present embodiment applies the present invention in a front-engine, rear-drive (FR) four-wheel vehicle, and utilizes an M/C self-suction and M/C return form as a hydraulic circuit.

Figure 12:
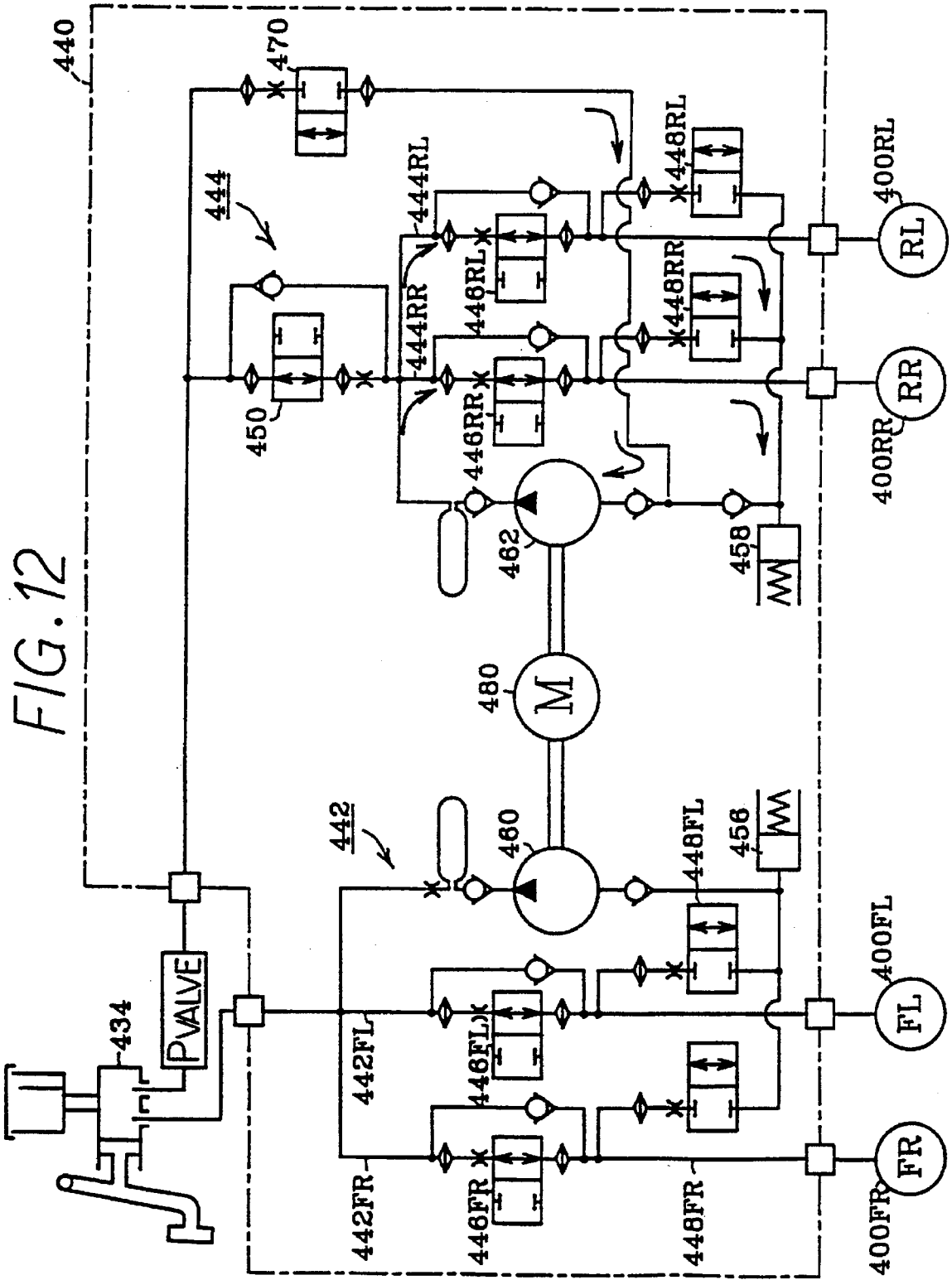
FIG. 12 is a circuit diagram indicating a structure of a hydraulic circuit according to a fourth embodiment.
Figure 13:
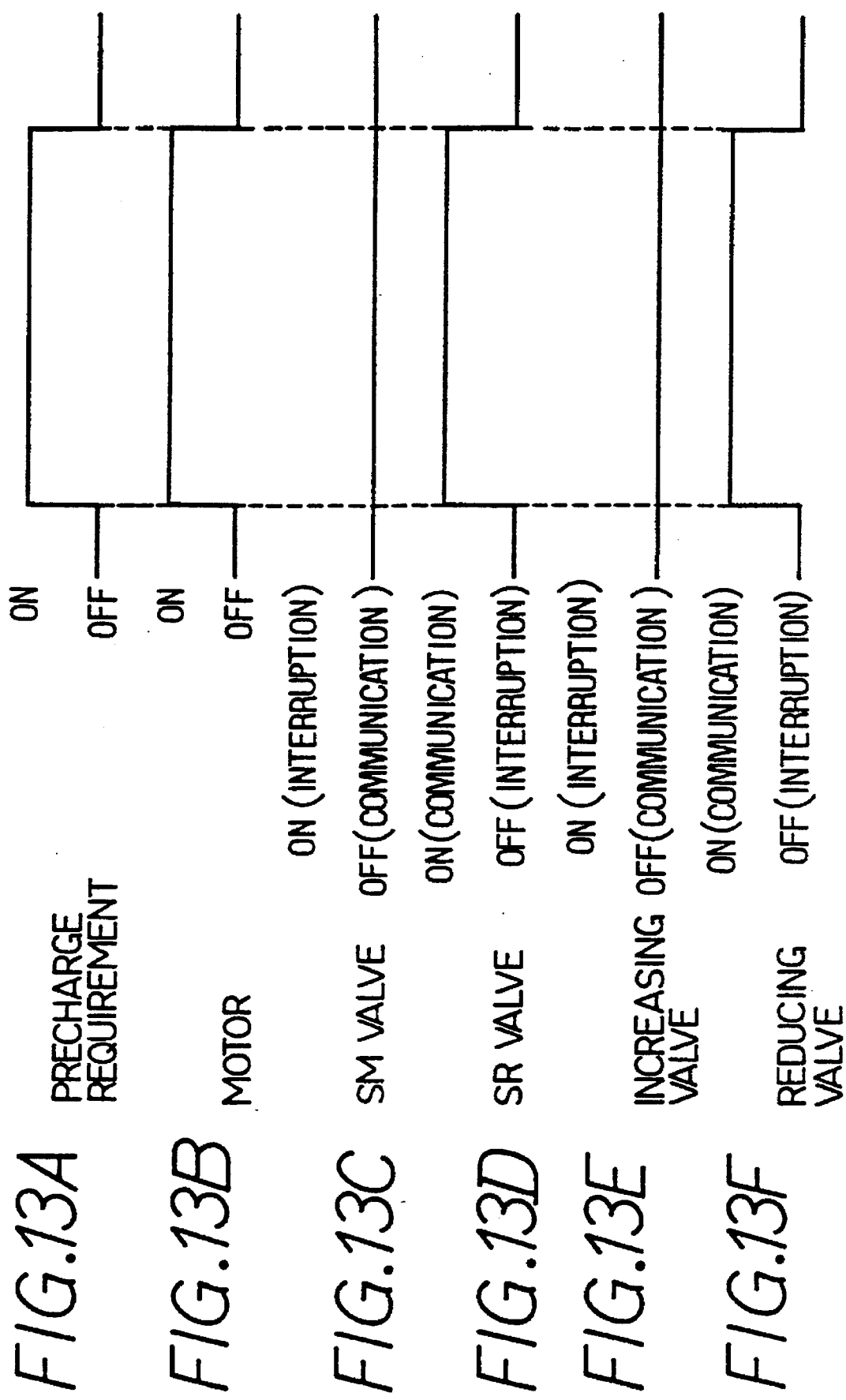
FIGS. 13A, 13B, 13C, 13D, 13E and 13F are timing charts indicating processing of precharge control according to the fourth embodiment.

A hydraulic circuit 440 of the present embodiment has a structure corresponding to an FR vehicle and, as shown in FIG. 12, is provided with dual-system hydraulic paths 442 and 444 to supply brake fluid sent under pressure from an M/C 434 to a front-left wheel FL and front-right wheel FR and to a rear-right wheel RR and rear-left wheel RL, and to supply brake fluid sent under pressure from a reservoir 468 of the M/C 434 to the rear-right wheel RR and rear-left wheel respectively. Provided in the hydraulic paths 442FL and 442FR reaching the W/Cs 400FL and 400FR of the left and right front wheels and FR, which are driven wheels, are pressure-increasing valves 446FL and 446FR, which are switchable to a pressure-increasing position to communicate the paths 442FL and 442FR and to a holding position to interrupt the paths 442FL and 442FR, as well as pressure-reducing valves 448FL and 448FR to expel brake fluid within the respective W/Cs 400FL and 400FR.

Meanwhile, of the foregoing respective hydraulic paths 442 and 444, pressure-increasing valves 446RL and 446RR and pressure-reducing valves 448RL and 448RR are provided in the hydraulic paths 442RL and 444RR reaching the W/Cs 400RL and 400RR of the left and right rear wheels RL and RR which are the driving wheels, similarly to the driven wheel side; along with this, an SM valve 450 is disposed at the M/C 434 side of the respective pressure-increasing valves 446RL and 446RR as the switching valve to communicate and interrupt the path thereof.

Additionally, reservoirs 456 and 458 which temporarily accumulate brake fluid expelled from the pressure-reducing valves 448FL, 448FR, 448RR, and 448RL are provided in the hydraulic paths 442 and 444, pumps 460 and 462 to pump up brake fluid from the reservoirs 456 and 458 side are also provided, and the two pumps 460 and 462 are driven by a motor 480.

Furthermore, an SM valve 450 to communicate and interrupt a path reaching from the M/C 434 to the pressure-increasing valves 446RL and 446RR is disposed in the foregoing hydraulic path 444; an SR valve 470 to communicate and interrupt a path reaching from the M/C 434 to the pump 462 intake side is also disposed.

Accordingly, when slippage occurs in the respective wheels FL to RR during vehicle braking, a brake controller controls brake-fluid pressure within the respective W/Cs 400FL to 400RR in correspondence with slippage states of the respective wheels FL to RR by initiating ABS control and respectively switching on or off the pressure-increasing valves 446FL to 446RR and pressure-reducing valves 448FL to 448RR in the above-described hydraulic path 440.

Additionally, when slippage occurs in the driving wheels RL and RR during vehicle acceleration, E/G TRC control are initiated to suppress output torque of an internal combustion engine, and along with this, brake TRC control is initiated, the SM valve 450 and SR valve 470 in the hydraulic circuit 440 are switched on, and the pressure-increasing valves 446RL and 446RR and pressure-reducing valves 448RL and 448RR are switched on or off, thereby applying a braking force to the driving wheels RL and RR and suppressing slippage.

A drive method of precharge control in an apparatus according to the present embodiment will be described hereinafter with reference to FIGS. 13A to 13F. Control according to the present embodiment, similarly to the above-described first embodiment, performs precharge control and accumulates a required amount of brake fluid before performing brake TRC control at a time of a low temperature.

In a case where, for example, water temperature or oil temperature is at a low-temperature state, a condition to execute precharge control has been fulfilled, and a precharge request has been made, the SM valve 450 is switched off and held in a communicated state. Along with this, the SR valve 470 is switched on and held in a communicated state. Additionally, the pressure-increasing valves 446RL and 446RR are switched off and held in a communicated state, and the pressure-reducing valves 448RL and 448RR are switched on and switched to a communicated state. Accordingly, a motor 480 is switched on and the pump 462 is driven in this state.

As a result thereof, as shown by the arrows in FIG. 12, brake fluid is first comes to be accumulated in the reservoir 458 of the driving-wheel side from the M/C 434 side and via the SR valve 470, the pressure-increasing valves 446RR and 446RL, and the pressure-reducing valves 448RR and 448RL, due to the pump 462.

In this way, an FR vehicle is provided with a hydraulic circuit 440 having self-suction pumps 460 and 462, an SM valve 450, an SR valve 470, and the like, and the present embodiment performs ABS control and TRC control by using the hydraulic circuit 440. In this case, brake fluid can be accumulated in the reservoir 458 of the driving-wheel side before performing brake TRC control when at a low temperature, and so an effect is demonstrated in which a sufficient amount of pump discharge for brake TRC control can be assured, similarly to the above-described first embodiment.

(Fifth embodiment)

An automotive brake fluid control apparatus according to a fifth embodiment will be described hereinafter.

The present embodiment is applied to an FR vehicle having a hydraulic circuit to perform ABS control and TRC control, and utilizes a reservoir self-suction and reservoir return form as a hydraulic circuit.

Figure 14:
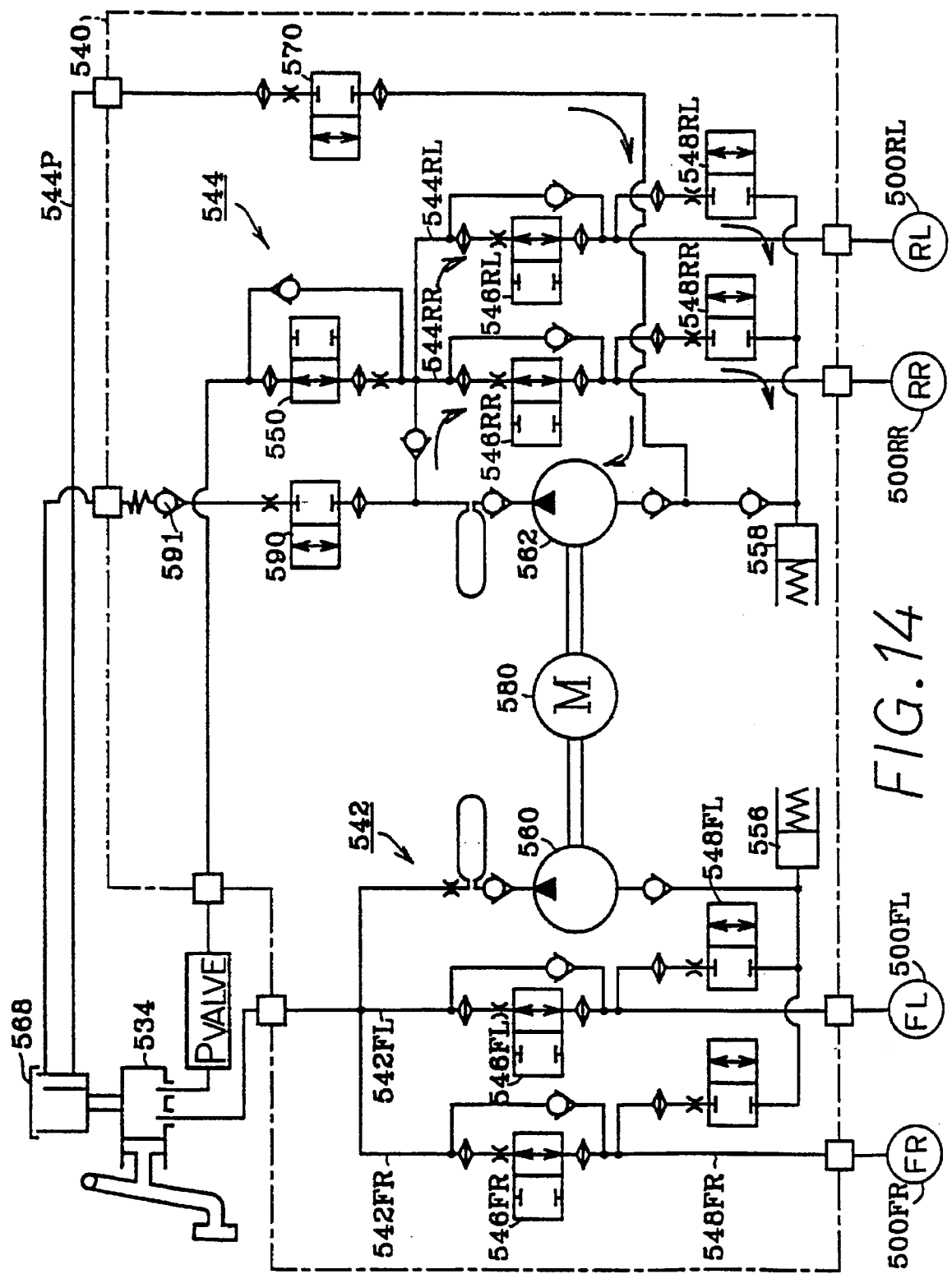
FIG. 14 is a circuit diagram indicating a structure of a hydraulic circuit according to a fifth embodiment.
Figure 15:
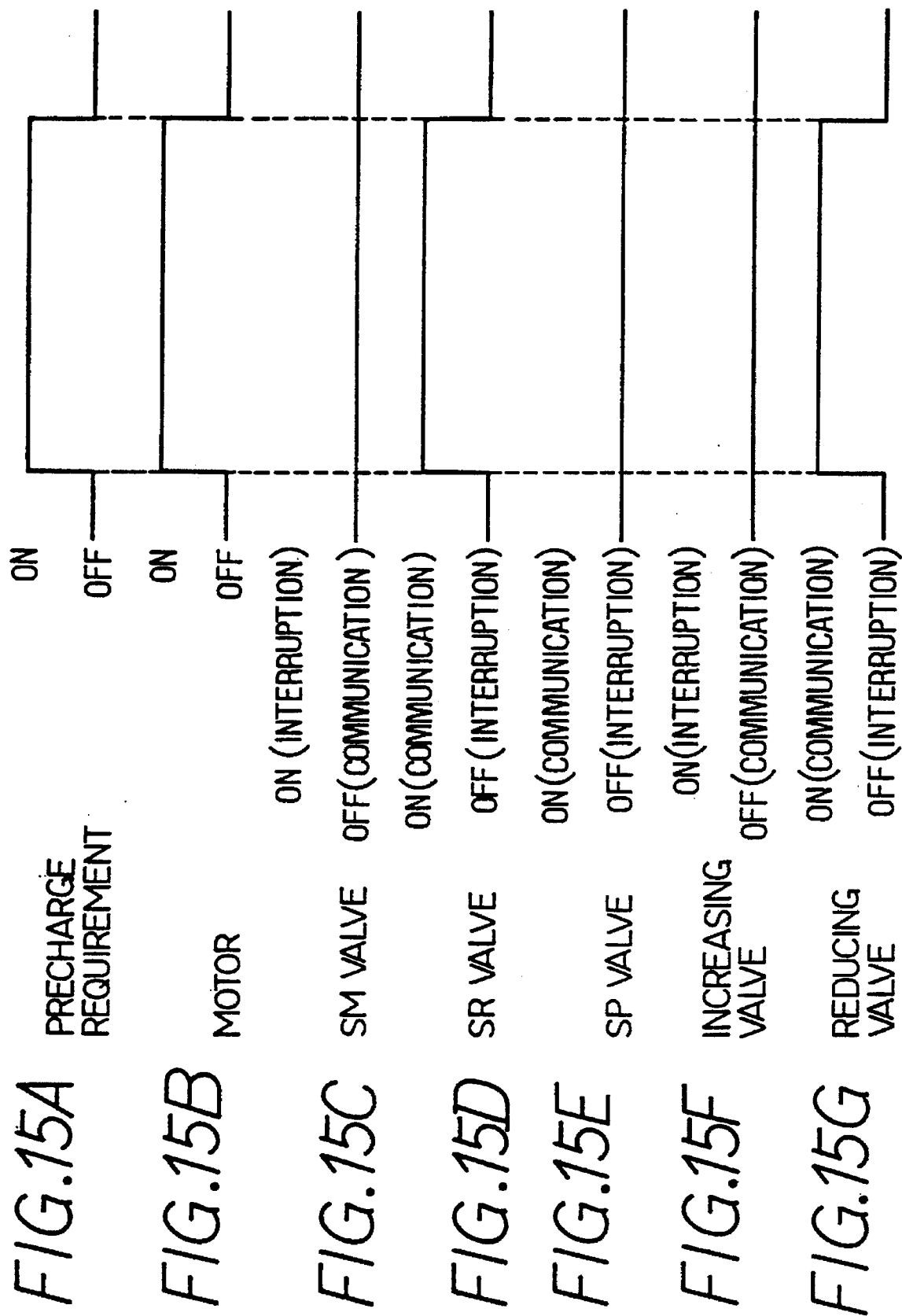
FIGS. 15A, 15B, 15C, 15D, 15E, 15F and 15G are timing charts indicating processing of precharge control according to the fifth embodiment.

A hydraulic circuit 540 according to the present embodiment as shown in FIG. 14, is provided with dual-system hydraulic paths 542 and 544 to supply brake fluid sent under pressure from an M/C 534 to a front-left wheel FL and front-right wheel FR and to a rear-right wheel RR and rear-left wheel RL, and to supply brake fluid sent under pressure from a reservoir 568 of the M/C 534 to the rear-right wheel RR and rear-left wheel RL, respectively.

Accordingly, pressure-increasing valves 546FL and 546FR and pressure-reducing valves 548FL and 548FR are provided in hydraulic paths 542FL and 542FR reaching W/Cs 500FL and 500FR of the left and right front wheels FL and FR which are driven wheels.

Meanwhile, pressure-increasing valves 546RL and 546RR and pressure-reducing valves 548RL and 548RR are provided in hydraulic paths 544RL and 544RR reaching the W/Cs 500RL and 500RR of the left and right rear wheels RL and RR which are the driving wheels, similarly to the driven wheel side; along with this, an SM valve 550 is disposed at the M/C 534 side of the respective pressure-increasing valves 546RL and 546RR.

Additionally, reservoirs 556 and 558, which temporarily accumulate brake fluid expelled from the pressure-reducing valves 548FL to 548RR, are provided in the respective hydraulic paths 542 and 544, pumps 560 and 562 to pump up brake fluid thereof from the reservoir 556 and 558 side are also provided, and the two pumps 560 and 562 are driven by a motor 580.

Furthermore, an oil-supply path 544P to supply brake fluid directly to the hydraulic pump 562 from a reservoir 568 provided in an upper portion of the M/C 534 during execution of brake TRC control is provided in the foregoing hydraulic circuit 540; provided in this oil-supply path 544P is an SR valve 570 to communicate and interrupt the path thereof.

Moreover, provided in a path on a pump 562 discharge side reaching the reservoir 568 is an SP valve 590 to communicate and interrupt the path reaching a pressure-regulating valve 591.

A drive method of precharge control in an apparatus according to the present embodiment will be described hereinafter with reference to FIGS. 15A to 15G. Control according to the present embodiment, similarly to the above-described first embodiment, performs precharge control and accumulates a required amount of brake fluid before performing brake TRC control at a time of a low temperature.

In a case where, for example, water temperature or oil temperature is at a low-temperature state, a condition to execute precharge control has been fulfilled, and a precharge request has been made, the SM valve 550 is switched off and held in an communicated state, and along with this, the SR valve 570 is switched on and held in a communicated state, and moreover the SP valve 590 is switched off and held in an interrupted state. Additionally, the pressure-increasing valves 546RL and 546RR are switched off and held in a communicated state, and the pressure-reducing valves 548RL and 548RR are switched on and switched to a communicated state. Accordingly, a motor 580 is switched on and the pump 562 is driven in this state.

As a result thereof, as shown by the arrows in FIG. 14, brake fluid is first accumulated in the reservoir 558 of the driving-wheel side from the reservoir 568 side and via the SR valve 570, the pressure-increasing valves 546RR and 546RL, and the pressure-reducing valves 548RR and 548RL, due to the pump 562.

In this way, an FR vehicle is provided with a hydraulic circuit 540 having self-suction pump 562, an SM valve 550, an SR valve 570, and the like, and the present embodiment performs ABS control and TRC control by using the hydraulic circuit 540. In this case, brake fluid can be accumulated in the reservoir 558 of the driving-wheel side before performing brake TRC control when at a low temperature, and so an effect is demonstrated in which a sufficient amount of pump discharge for brake TRC control can be assured, similarly to the above-described first embodiment.

(Sixth embodiment)

An automotive brake fluid control apparatus according to a sixth embodiment will be described hereinafter.

The present embodiment is applied to an FR vehicle having a hydraulic circuit to perform ABS control and TRC control, and utilizes a reservoir self-suction and M/C return form as a hydraulic circuit.

Figure 16:
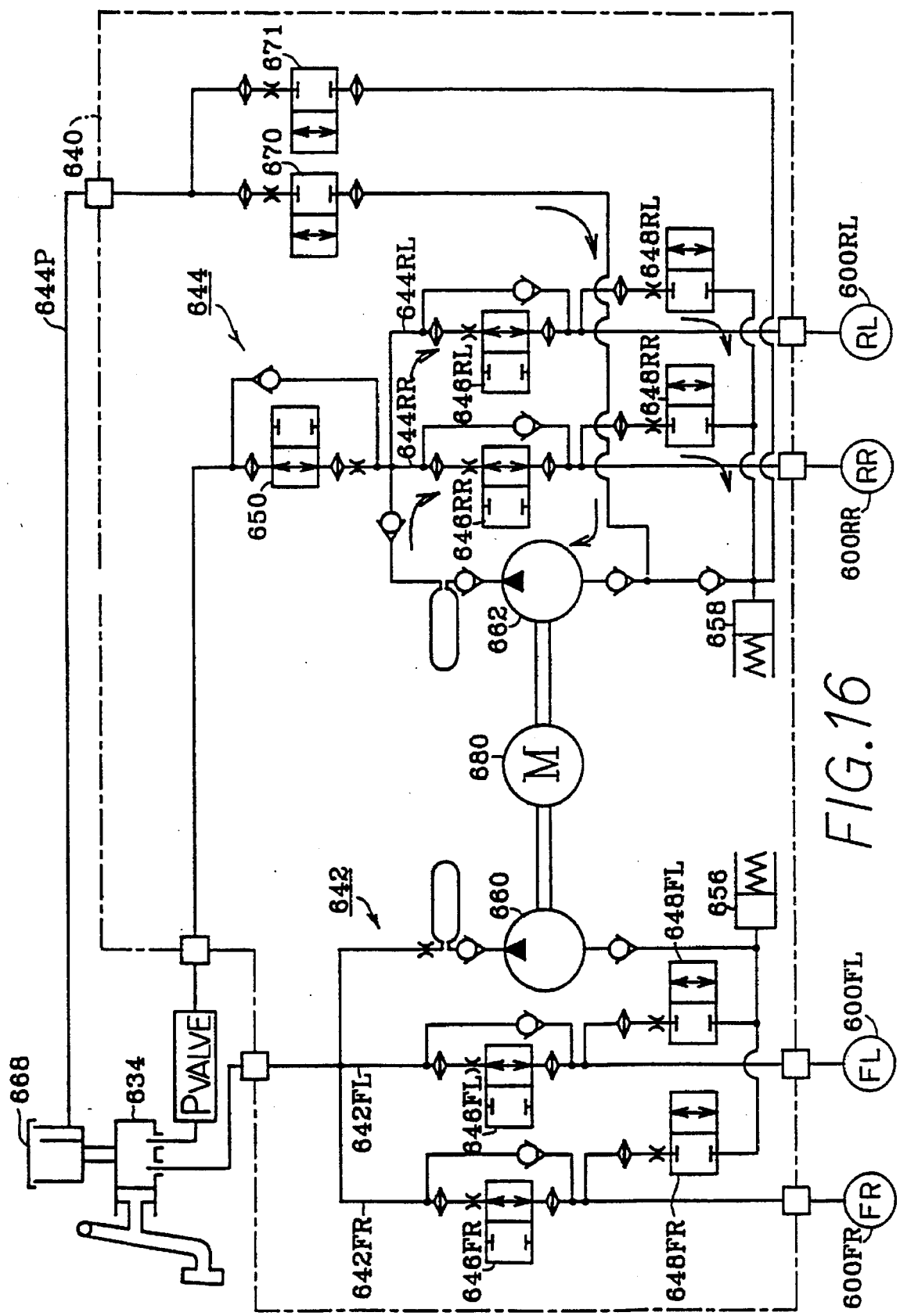
FIG. 16 is a circuit diagram indicating a structure of a hydraulic circuit according to a sixth embodiment.
Figure 17:
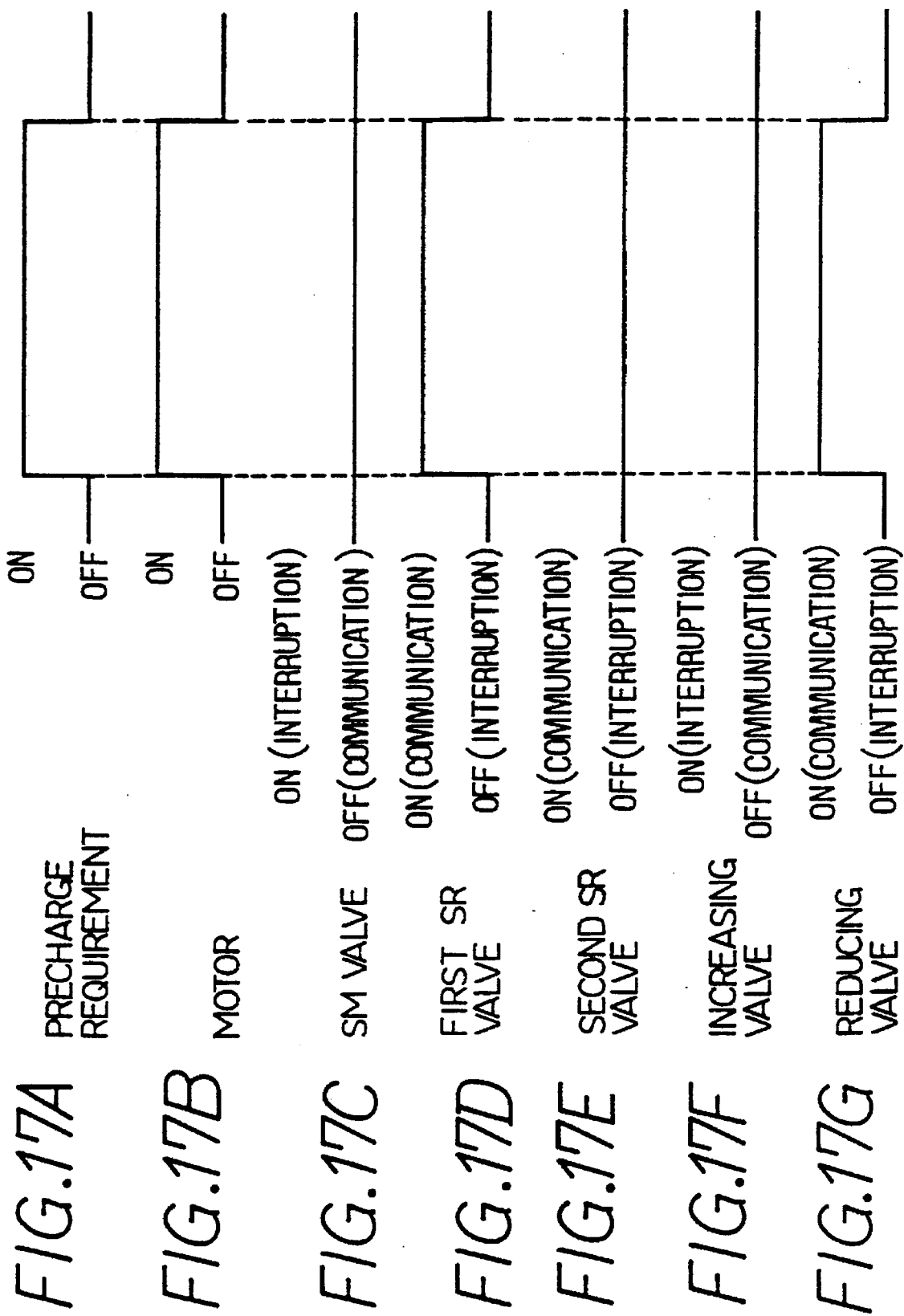
FIGS. 17A, 17B, 17C, 17D, 17E, 17F and 17G are timing charts indicating processing of precharge control according to the sixth embodiment.
Figure 18:
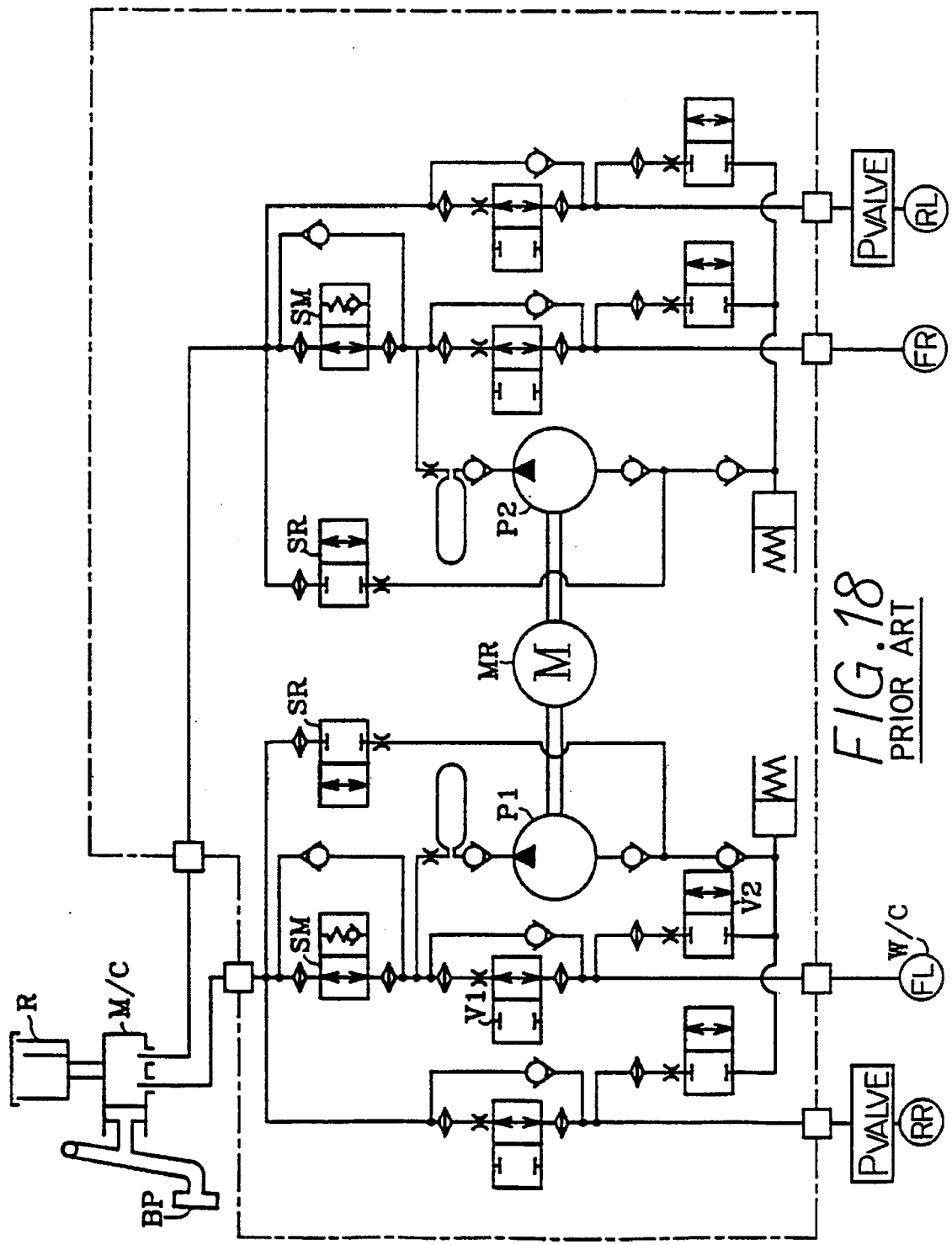
FIG. 18 is a hydraulic circuit diagram indicating the prior art.

A hydraulic circuit 640 according to the present embodiment, as shown in FIG. 16, is provided with dual-system hydraulic paths 642 and 644 to supply brake fluid sent under pressure from an M/C 634 to a front-left wheel FL and front-right wheel FR and to a rear-right wheel RR and rear-left wheel RL, and to supply brake fluid sent under pressure from a reservoir 668 of the M/C 634 to the rear-right wheel RR and rear-left wheel RL, respectively.

Accordingly, pressure-increasing valves 646FL and 646FR and pressure-reducing valves 648FL and 648FR are provided in hydraulic paths 642FL and 642FR reaching W/Cs 600FL and 600FR of the left and right front wheels FL and FR which are driven wheels.

Meanwhile, pressure-increasing valves 646RL and 646RR and pressure-reducing valves 648RL and 648RR are provided in hydraulic paths 642RL and 644RR reaching W/Cs 600RL and 600RR of the left and right rear wheels RL and RR which are driving wheels, similarly to the driven wheel side; along with this, an SM valve 650 is disposed at the M/C 634 side of the respective pressure-increasing valves 646RL and 646RR.

Additionally, reservoirs 656 and 658, which temporarily accumulate brake fluid expelled from the pressure-reducing valves 648FL to 648RR, are provided in the respective hydraulic paths 642 and 644, pumps 660 and 662 to pump up brake fluid thereof from the reservoir 656 and 658 side are also provided, and the two pumps 660 and 662 are driven by a motor 680.

Furthermore, an oil-supply path 644P to supply brake fluid directly to the hydraulic pump 662 from a reservoir 668 provided in an upper portion of the M/C 634 during execution of brake TRC control is provided in the foregoing hydraulic circuit 644; provided in this oil-supply path 644P is a first SR valve 670 to communicate and interrupt the path thereof. Moreover, provided in a path reaching from the reservoir 668 of the M/C 634 side to the reservoir 658 on the W/C 600RR and 600RL side is a second SR valve 671 to communicate and interrupt the foregoing path.

A drive method of precharge control in an apparatus according to the present embodiment will be described hereinafter with reference to FIGS. 17A to 17G. Control according to the present embodiment, similarly to the above-described first embodiment, performs precharge control and accumulates a required amount of brake fluid before performing brake TRC control.

In a case where, for example, water temperature and oil temperature are at a low-temperature state, a condition to execute precharge control has been fulfilled, and a precharge request has been made, the SM valve 650 is switched off and held in a communicated state, and along with this, the first SR valve 670 is switched on and held in a communicated state, and moreover the second SR valve 671 is switched off and held in an interrupted state. Additionally, the pressure-increasing valves 646RL and 646RR are switched off and held in a communicated state, and the pressure-reducing valves 648RL and 648RR are switched on and switched to a communicated state. Accordingly, a motor 680 is switched on and the pump 662 is driven in this state.

As a result thereof, as shown by the arrows in FIG. 16, brake fluid is first accumulated in the reservoir 658 of the driving-wheel side from the reservoir 668 side and via the first SR valve 670, the pressure-increasing valves 646RR and 646RL, and the pressure-reducing valves 648RR and 648RL, due to the pump 662.

In this way, an FR vehicle is provided with a hydraulic circuit 640 having the self-priming pump 662, the SM valve 650, two SR valves 670 and 671, and the like, and the present embodiment performs ABS control and TRC control by using the hydraulic circuit 640. In this case, brake fluid can be accumulated in the reservoir 658 of the driving-wheel side before performing brake TRC control when at a low temperature, and so an effect is demonstrated in which a sufficient amount of pump discharge for brake TRC control can be assured, similarly to the above-described first embodiment.

In the embodiments described above, the SM valve(s) is established to the communicated state during the precharge control and switched to the interrupted state when the brake TRC control is initiated. It is, however, acceptable that the SM valve(s) is established to the interrupted state during the precharge control. In this case, the SM valve can certainly prevent brake fluid discharged from the pump from flowing toward the M/C.

Furthermore, the present invention is in no way exclusively limited to the above-described embodiments, but can be embodied in various modes within a scope which does not depart from the essence of the present invention.

What is claimed is:

1. An automotive brake fluid control apparatus, comprising:

a reservoir to accumulate brake fluid expelled from a wheel cylinder via a pressure-control valve; and a pump to boost pressure of brake fluid accumulated in said reservoir and supply said brake fluid to a wheel-cylinder side via said pressure-control valve, wherein said pump is a self-suction pump that takes in brake fluid from a master-cylinder side thereof;

pump operating means for causing said pump to start operation at a predetermined timing before initiating regulation of brake fluid pressure applied to said wheel cylinder by said pressure-control valve, to take in brake fluid from said master-cylinder side; and communicating path forming means for defining a path wherein a discharge side and an intake side of said pump are communicated so that brake fluid discharged from said pump circulates in said communicating path upon operation of said pump by said pump operating means.

2. An automotive brake fluid control apparatus according to claim 1, wherein said pressure-control valve comprises:

a pressure-increasing control valve to switch communication and interruption of said pump discharge side and said wheel cylinder; and a pressure-reducing control valve to switch communication and interruption of said wheel cylinder and said reservoir, and wherein said communicating path forming means defines said communicating path by driving both said pressure-increasing control valve and said pressure-reducing control valve to a communicated state.

3. An automotive brake fluid control apparatus according to claim 1, further comprising:

an interrupt valve disposed in a brake conduit between said pressure-control valve and said master cylinder to supply said brake fluid from said pump to a brake conduit connecting said interrupt valve and said pressure-control valve, and wherein:

said communicating path forming means drives said interrupt valve to interrupt communication of said pressure-control valve and said master cylinder when driving said pressure-control valve to cause said pump discharge side and intake side to be communicated.

4. An automotive brake fluid control apparatus according to claim 1, further comprising:

discharge state detecting means for detecting a state of insufficient amount of discharge from said pump; and control initiating means for causing to initiate control by said pump operating means and said communicating path forming means at a predetermined timing before initiating regulation of brake fluid pressure applied to said wheel cylinder by said pressure-control valve responsive to detection of a state of insufficient amount of discharge from said pump by said discharge state detecting means.

5. An automotive brake fluid control apparatus according to claim 4, wherein:

said discharge state detecting means comprises temperature estimating means to estimate a temperature of said brake fluid; and an amount of discharge of said pump is detected as an insufficient state when temperature estimated by said temperature estimating means is a predetermined temperature or less.

6. An automotive brake fluid control apparatus according to claim 5, wherein:

said temperature estimating means has water temperature detecting means to detect a coolant-water temperature of an internal combustion engine; and said brake-fluid temperature is estimated from said detected coolant-water temperature.

7. An automotive brake fluid control apparatus according to claim 1, further comprising:

vehicle state detecting means to detect a stopped or extremely low-speed state of a vehicle; and control initiating means to cause to initiate control by said pump operating means and said communicating path forming means at a predetermined timing before initiating regulation of brake fluid pressure applied to said wheel cylinder by said pressure-control valve when a stopped or extremely low-speed state of a vehicle has been detected by said vehicle state detecting means.

8. An automotive brake fluid control apparatus according to claim 1, further comprising:

control initiating means for activating said pump operating means and said communicating path forming means immediately after starting of an internal combustion engine of said vehicle.

9. An automotive brake fluid control apparatus according to claim 1, further comprising:

travel initiation detecting means for detecting initiation of travel of a vehicle; and control terminating means for causing to terminate control by said pump operating means and said communicating path forming means when travel initiation of said vehicle has been detected by said travel initiation detecting means.

10. An automotive brake fluid control apparatus according to claim 9, wherein:

said travel initiation detecting means is provided with speed detecting means to detect travel speed of said vehicle; and detection as said travel initiation of said vehicle is performed when a travel speed which said speed detecting means detects has reached a predetermined speed.

11. An automotive brake fluid control apparatus according to claim 1, further comprising:

brake operation detecting means for detecting brake operation by a driver; and control terminating means for causing to terminate activation of both of said pump operating means and said communicating path forming means responsive to said brake operation detecting means detecting said brake operation.

12. An automotive brake fluid control apparatus according to claim 1, further comprising:

counting means for counting a time duration since said pump operating means and said communicating path forming means are activated; and control terminating means for terminating activation of both of said pump operating means and said communicating path forming means responsive to said time duration having reached a predetermined time.

13. An automotive brake fluid control apparatus, comprising:

a reservoir to accumulate brake fluid expelled from a wheel cylinder via a pressure-control valve; and a pump to boost pressure of brake fluid accumulated in said reservoir and supply said brake fluid to a wheel-cylinder side via said pressure-control valve, wherein said pump is a self-suction pump that takes in brake fluid from a master-cylinder side, and antiskid control and traction control are performed using said pump as a common pressure source, and further comprising:

a first switching valve, disposed in a conduit connecting said master-cylinder side and an intake side of said pump, to switch communication and interruption of said conduit;

communication driving means for driving said first switching valve to a state wherein said conduit is communicated at a predetermined timing before said traction control is executed;

pump operating means for causing said pump to start operating at said predetermined timing to take in brake fluid from said master-cylinder side; and communicating path forming means for forming a communicating path wherein a discharge side and an intake side of said pump are communicated so that brake fluid discharged from said pump circulates in said communicating path upon operation of said pump by said pump operating means.

14. An automotive brake fluid control apparatus according to claim 13, wherein said pressure-control valve comprises:

a pressure-increasing control valve to switch communication and interruption of said pump discharge side and said wheel cylinder; and a pressure-reducing control valve to switch communication and interruption of said wheel cylinder and said reservoir, and wherein said communicating path forming means defines said communicating path by driving both said pressure-increasing control valve and said pressure-reducing control valve to a communicated state.

15. An automotive brake fluid control apparatus according to claim 13, further comprising:

an interrupt valve disposed in a brake conduit between said pressure-control valve and said master cylinder to supply said brake fluid from said pump to a brake conduit connecting said interrupt valve and said pressure-control valve, and wherein:

said communicating path forming means drives said interrupt valve to interrupt communication of said pressure-control valve and said master cylinder when driving said pressure-control valve to cause said pump discharge side and intake side to be communicated.

16. An automotive brake fluid control apparatus according to claim 13, further comprising:

discharge state detecting means for detecting a state of insufficient amount of discharge from said pump; and control initiating means for causing to initiate control by said pump operating means and said communicating path forming means at a predetermined timing before initiating regulation of brake fluid pressure applied to said wheel cylinder by said pressure-control valve responsive to detection of a state of insufficient amount of discharge from said pump by said discharge state detecting means.

17. An automotive brake fluid control apparatus according to claim 16, wherein:

said discharge state detecting means comprises temperature estimating means to estimate a temperature of said brake fluid; and an amount of discharge of said pump is detected as an insufficient state when temperature estimated by said temperature estimating means is a predetermined temperature or less.

18. An automotive brake fluid control apparatus according to claim 17, wherein:

said temperature estimating means has water temperature detecting means to detect a coolant-water temperature of an internal combustion engine; and said brake-fluid temperature is estimated from said detected coolant-water temperature.

19. An automotive brake fluid control apparatus according to claim 13, further comprising:

vehicle state detecting means for detecting a stopped or extremely low-speed state of a vehicle; and control initiating means for causing to initiate control by said pump operating means and said communicating path forming means at a predetermined timing before initiating regulation of brake fluid pressure applied to said wheel cylinder by said pressure-control valve when a stopped or extremely low-speed state of a vehicle has been detected by said vehicle state detecting means.

20. An automotive brake fluid control apparatus according to claim 13, further comprising:

control initiating means for activating said pump operating means and said communicating path forming means immediately after starting of an internal combustion engine of said vehicle.

21. An automotive brake fluid control apparatus according to claim 13, further comprising:

travel initiation detecting means for detecting initiation of travel of a vehicle; and control terminating means for causing to terminate control by said pump operating means and said communicating path forming means when travel initiation of said vehicle has been detected by said travel initiation detecting means.

22. An automotive brake fluid control apparatus according to claim 21, wherein:

said travel initiation detecting means is provided with speed detecting means to detect travel speed of said vehicle; and detection as said travel initiation of said vehicle is performed when a travel speed which said speed detecting means detects has reached a predetermined speed.

23. An automotive brake fluid control apparatus according to claim 13, further comprising:

brake operation detecting means for detecting brake operation by a driver; and control terminating means for causing to terminate activation of both of said pump operating means and said communicating path forming means responsive to said brake operation detecting means detecting said brake operation.

24. An automotive brake fluid control apparatus according to claim 13, further comprising:

counting means for counting a time duration since said pump operating means and said communicating path forming means are activated; and control terminating means for terminating activation of both of said pump operating means and said communicating path forming means responsive to said time duration having reached a predetermined time.

25. An automotive brake fluid control apparatus, comprising:

a reservoir to accumulate brake fluid expelled from a wheel cylinder via a hydraulic circuit including a pressure-control valve; and a pump to boost pressure of said brake fluid accumulated in said reservoir and to supply said brake fluid to a wheel-cylinder side via said pressure-control valve, wherein said pump is a self-suction pump that takes in brake fluid from a master-cylinder side thereof;

a pump controller causing said pump to start operating at a predetermined timing before initiating regulation of brake fluid pressure applied to said wheel cylinder by said pressure-control valve, to take in brake fluid from said master-cylinder side; and a hydraulic circuit controller actuating said pressure-control valve so as to define a communicating path wherein a discharge side and an intake side of said pump are communicated so that brake fluid discharged from said pump circulates in said communicating path upon operation of said pump by said pump controller.

26. An automotive brake fluid control apparatus according to claim 25, wherein said pressure-control valve comprises:

a pressure-increasing control valve to switch communication and interruption of said pump discharge side and said wheel cylinder; and a pressure-reducing control valve to switch communication and interruption of said wheel cylinder and said reservoir, and wherein said hydraulic circuit controller defines said communicating path by driving both said pressure-increasing control valve and said pressure-reducing control valve to a communicated state.

27. An automotive brake fluid control apparatus according to claim 25, further comprising:

an interrupt valve disposed in a brake conduit between said pressure-control valve and said master cylinder to supply said brake fluid from said pump to a brake conduit connecting said interrupt valve and said pressure-control valve, and wherein:

said hydraulic circuit controller drives said interrupt valve to interrupt communication of said pressure-control valve and said master cylinder when activating said pressure-control valve to cause said pump discharge said and intake side to be communicated.

28. An automotive brake fluid control apparatus according to claim 25, further comprising:

a discharge detector detecting a state of insufficient amount of discharge from said pump; and wherein said pump controller and said hydraulic circuit controller perform their respective operations at a predetermined timing before initiating regulation of brake fluid pressure applied to said wheel cylinder by said pressure-control valve responsive to detection of a state of insufficient amount of discharge from said pump by said discharge detector.

29. An automotive brake fluid control apparatus according to claim 28, wherein said discharge detector comprises a temperature estimating unit estimating a temperature of said brake fluid; and an amount of discharge of said pump is detected as being insufficient responsive to a temperature estimated by said temperature estimating unit being not greater than a predetermined temperature.

30. An automotive brake fluid control apparatus according to claim 29, wherein said temperature estimating unit has water temperature detector to detect a coolant-water temperature of an internal combustion engine; and said brake-fluid temperature is estimated from said detected coolant-water temperature.

31. An automotive brake fluid control apparatus according to claim 25, further comprising:

a vehicle speed detector detecting whether a vehicle having the brake fluid control apparatus is traveling at no faster than an extremely low speed; and wherein said pump controller and said hydraulic circuit controller perform their respective operations at a predetermined timing before initiating regulation of brake fluid pressure applied to said wheel cylinder by said pressure-control valve responsive to one of a stopped state and an extremely low speed being detected by said vehicle speed detector.

32. An automotive brake fluid control apparatus according to claim 25, wherein said pump controller and said hydraulic circuit controller perform their respective operations immediately after starting of an internal combustion engine of a vehicle having said brake fluid control apparatus.

33. An automotive brake fluid control apparatus according to claim 25, further comprising:

travel initiation detector detecting initiation of travel of a vehicle having said brake fluid control apparatus; and control terminating means for termination operation of said pump controller and said hydraulic circuit controller responsive to travel initiation of said vehicle has been detected by said travel initiation detector.

34. An automotive brake fluid control apparatus according to claim 33, wherein:

said travel initiation detector includes a vehicle speed detector; and detection of initiation of travel of said vehicle is performed responsive to a travel speed detected by said vehicle speed detector having reached a predetermined speed.

35. An automotive brake fluid control apparatus according to claim 25, further comprising:

brake operation detectors that detect operation of a brake by a driver; and wherein control operations of said pump controller and said hydraulic circuit controller are terminated responsive to said brake operation detector detecting brake operation.

36. An automotive brake fluid control apparatus according to claim 25, further comprising:

a counter counting a time duration since respective operations of said pump controller and said hydraulic circuit controller are initiated, wherein control operations of said pump controller and said hydraulic circuit controller are terminated responsive to said pump controller and said time duration having reached a predetermined time.

37. An automotive brake fluid control apparatus, comprising:

a reservoir to accumulate brake fluid expelled from a wheel cylinder via a hydraulic circuit including a pressure-control valve; and a pump to boost pressure of brake fluid accumulated in said reservoir and to supply said brake fluid to a wheel-cylinder side via said pressure-control valve, wherein said pump is a self-suction pump that takes in brake fluid from a master-cylinder side thereof, and antiskid control and traction control are performed by employing said pump as a common pressure source, and further comprising:

a first switching valve, disposed in a conduit connecting said master-cylinder side and an intake side of said pump, to switch communication and interruption of said conduit;

a valve controller driving said first switching valve to a state wherein said conduit starts to be communicated at a predetermined timing before said traction control is executed;

pump controller causing said pump to start operating at said predetermined timing to take in brake fluid from said master-cylinder side; and a hydraulic circuit controller activating said pressure-control valve so as to define a communicating path wherein a discharge side and an intake side of said pump are communicated so that brake fluid discharged from said pump circulates in said communicating path upon operation of said pump by said pump controller.

38. An automotive brake fluid control apparatus according to claim 37, wherein said pressure-control valve comprises:

a pressure-increasing control valve to switch communication and interruption of said pump discharge side and said wheel cylinder; and a pressure-reducing control valve to switch communication and interruption of said wheel cylinder and said reservoir, and wherein said hydraulic circuit controller defines said communicating path by driving both said pressure-increasing control valve and said pressure-reducing control valve to a communicated state.

39. An automotive brake fluid control apparatus according to claim 37, further comprising:

an interrupt valve disposed in a brake conduit between said pressure-control valve and said master cylinder to supply said brake fluid from said pump to a brake conduit connecting said interrupt valve and said pressure-control valve, and wherein:

said hydraulic circuit controller drives said interrupt valve to interrupt communication of said pressure-control valve and said master cylinder when activating said pressure-control valve to cause said pump discharge said and intake side to be communicated.

40. An automotive brake fluid control apparatus according to claim 37, further comprising:

a discharge detector detecting a state of insufficient amount of discharge from said pump; and wherein said pump controller and said hydraulic circuit controller perform their respective operations at a predetermined timing before initiating regulation of brake fluid pressure applied to said wheel cylinder by said pressure-control valve responsive to detection of a state of insufficient amount of discharge from said pump by said discharge detector.

41. An automotive brake fluid control apparatus according to claim 40, wherein said discharge detector comprises a temperature estimating unit estimating a temperature of said brake fluid; and an amount of discharge of said pump is detected as being insufficient state responsive to a temperature estimated by said temperature estimating unit being not greater than a predetermined temperature.

42. An automotive brake fluid control apparatus according to claim 41, wherein said temperature estimating unit has water temperature detector to detect a coolant-water temperature of an internal combustion engine; and said brake-fluid temperature is estimated from said detected coolant-water temperature.

43. An automotive brake fluid control apparatus according to claim 37, further comprising:

a vehicle speed detector detecting whether a vehicle having the brake fluid control apparatus is traveling at no faster than an extremely low speed; and wherein said pump controller and said hydraulic circuit controller perform their respective operations at a predetermined timing before initiating regulation of brake fluid pressure applied to said wheel cylinder by said pressure-control valve responsive to one of a stopped state and an extremely low speed being detected by said vehicle speed detector.

44. An automotive brake fluid control apparatus according to claim 37, wherein said pump controller and said hydraulic circuit controller perform their respective operations immediately after starting of an internal combustion engine of a vehicle having said brake fluid control apparatus.

45. An automotive brake fluid control apparatus according to claim 37, further comprising:

travel initiation detector detecting initiation of travel of a vehicle having said brake fluid control apparatus; and control terminating means for termination operation of said pump controller and said hydraulic circuit controller responsive to travel initiation of said vehicle has been detected by said travel initiation detector.

46. An automotive brake fluid control apparatus according to claim 45, wherein:

said travel initiation detector includes a vehicle speed detector; and detection of initiation of travel of said vehicle is performed responsive to a travel speed detected by said vehicle speed detector having reached a predetermined speed.

47. An automotive brake fluid control apparatus according to claim 37, further comprising:

brake operation detectors that detect operation of a brake by a driver; and wherein control operations of said pump controller and said hydraulic circuit controller are terminated responsive to said brake operation detector detecting brake operation.

48. An automotive brake fluid control apparatus according to claim 37, further comprising:

a counter counting a time duration since respective operations of said pump controller and said hydraulic circuit controller are initiated, wherein control operations of said pump controller and said hydraulic circuit controller are terminated responsive to said pump controller and said time duration having reached a predetermined time.

* * * * *